(12) United States Patent
Fahldieck et al.

(10) Patent No.: US 10,005,617 B2
(45) Date of Patent: Jun. 26, 2018

(54) BOTTLE CONVEYOR ARRANGEMENT FOR CONVEYING BOTTLES AND SIMILAR CONTAINERS

(71) Applicants: Andreas Fahldieck, Idar-Oberstein (DE); Nils Mallitzki, Simmern (DE)

(72) Inventors: Andreas Fahldieck, Idar-Oberstein (DE); Nils Mallitzki, Simmern (DE)

(73) Assignee: KHS GmbH, Dortmund (DE)

( * ) Notice: Subject to any disclaimer, the term of this patent is extended or adjusted under 35 U.S.C. 154(b) by 0 days. days.

(21) Appl. No.: 15/202,043

(22) Filed: Jul. 5, 2016

(65) Prior Publication Data

US 2016/0318713 A1    Nov. 3, 2016

Related U.S. Application Data

(63) Continuation-in-part of application No. PCT/EP2014/077274, filed on Dec. 10, 2014.

(30) Foreign Application Priority Data

Jan. 8, 2014    (DE) .......................... 10 2014 000 052

(51) Int. Cl.
| | |
|---|---|
| *B65G 21/00* | (2006.01) |
| *B65G 21/20* | (2006.01) |
| *B65G 21/06* | (2006.01) |
| *B65G 47/84* | (2006.01) |
| *B65G 29/00* | (2006.01) |

(52) U.S. Cl.
CPC ......... *B65G 21/2045* (2013.01); *B65G 21/06* (2013.01); *B65G 21/2072* (2013.01); *B65G 29/00* (2013.01); *B65G 47/846* (2013.01); *B65G 2201/0244* (2013.01)

(58) Field of Classification Search
CPC ...... B65G 21/06; B65G 47/846; B65G 29/00; B65G 21/2072; B65G 2201/0244; B65G 21/2045
USPC ..................... 198/480.1, 481.1, 836.3, 836.4
See application file for complete search history.

(56) References Cited

U.S. PATENT DOCUMENTS

| | | | | |
|---|---|---|---|---|
| 2008/0116042 | A1* | 5/2008 | McAlister .......... | B65G 21/2072 198/836.3 |
| 2011/0108389 | A1* | 5/2011 | Bonnain .............. | B65G 47/244 198/384 |
| 2016/0130091 | A1* | 5/2016 | Wolf .................. | B65G 21/2072 198/836.1 |

FOREIGN PATENT DOCUMENTS

| | | |
|---|---|---|
| DE | 44 36 201 A1 | 4/1996 |
| DE | 699 02 944 T2 | 8/2003 |
| DE | 10 2009 018 731 A1 | 10/2010 |

* cited by examiner

*Primary Examiner* — Gene O Crawford
*Assistant Examiner* — Lester III Rushin
(74) *Attorney, Agent, or Firm* — Nils H. Ljungman & Associates

(57) ABSTRACT

A container conveyor arrangement is used to convey containers, which arrangement includes a replaceable guide structure to guide containers. The guide structure comprises an upper guide element and a lower guide element, which are connected by an elongated connecting device to a carrier element. The connecting device can be rotated between a secure position, in which the lower guide element is secured to the carrier element, and an unsecured position, in which the lower guide element is not secured to the carrier element.

15 Claims, 11 Drawing Sheets

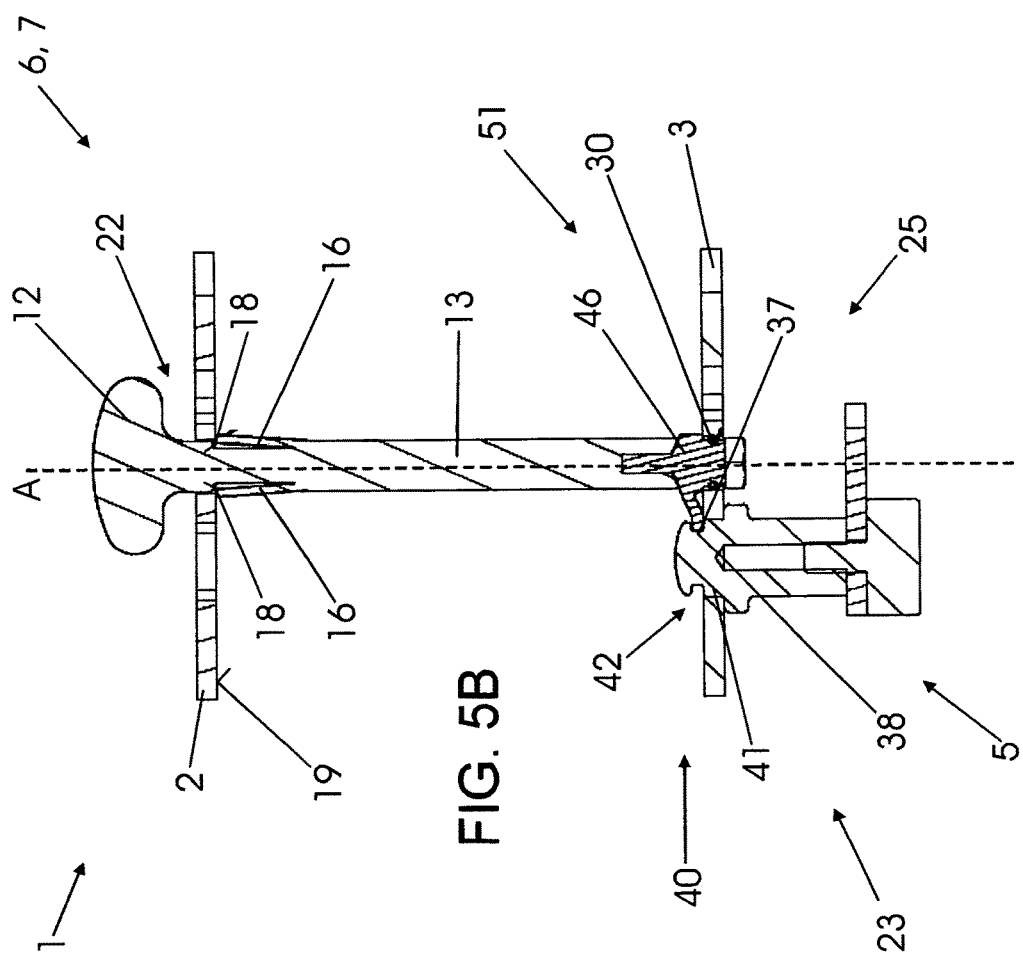

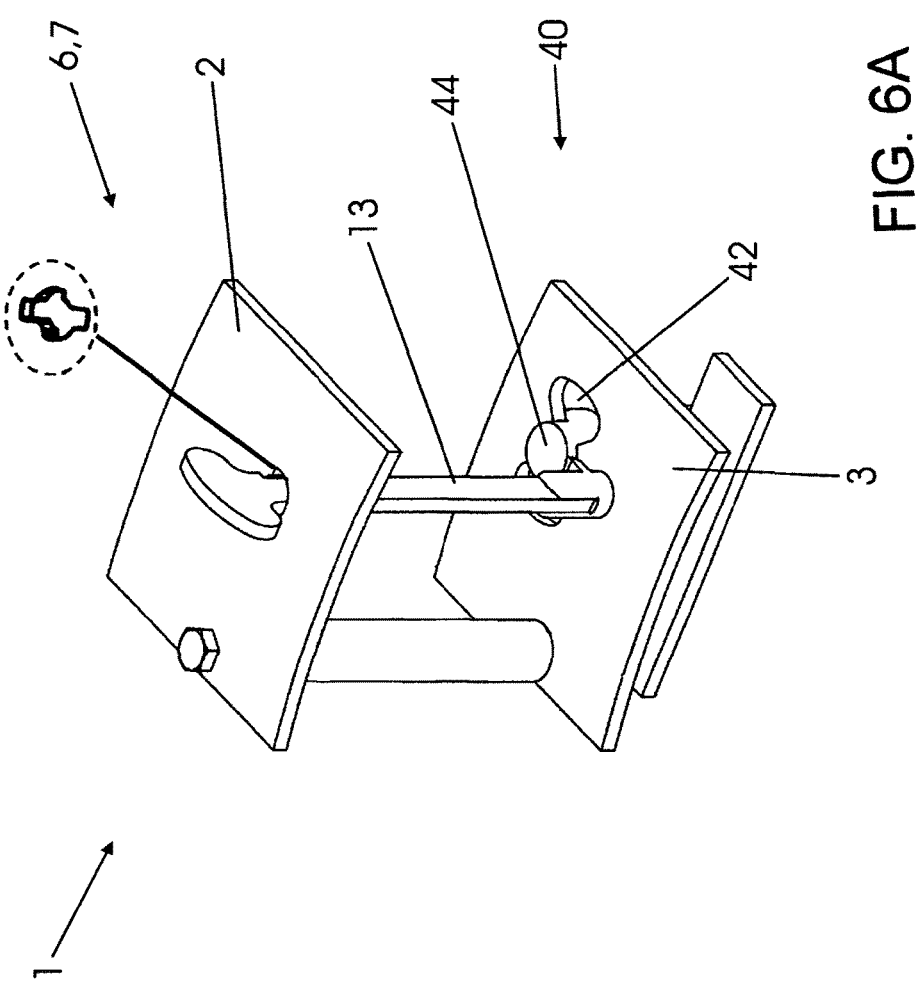

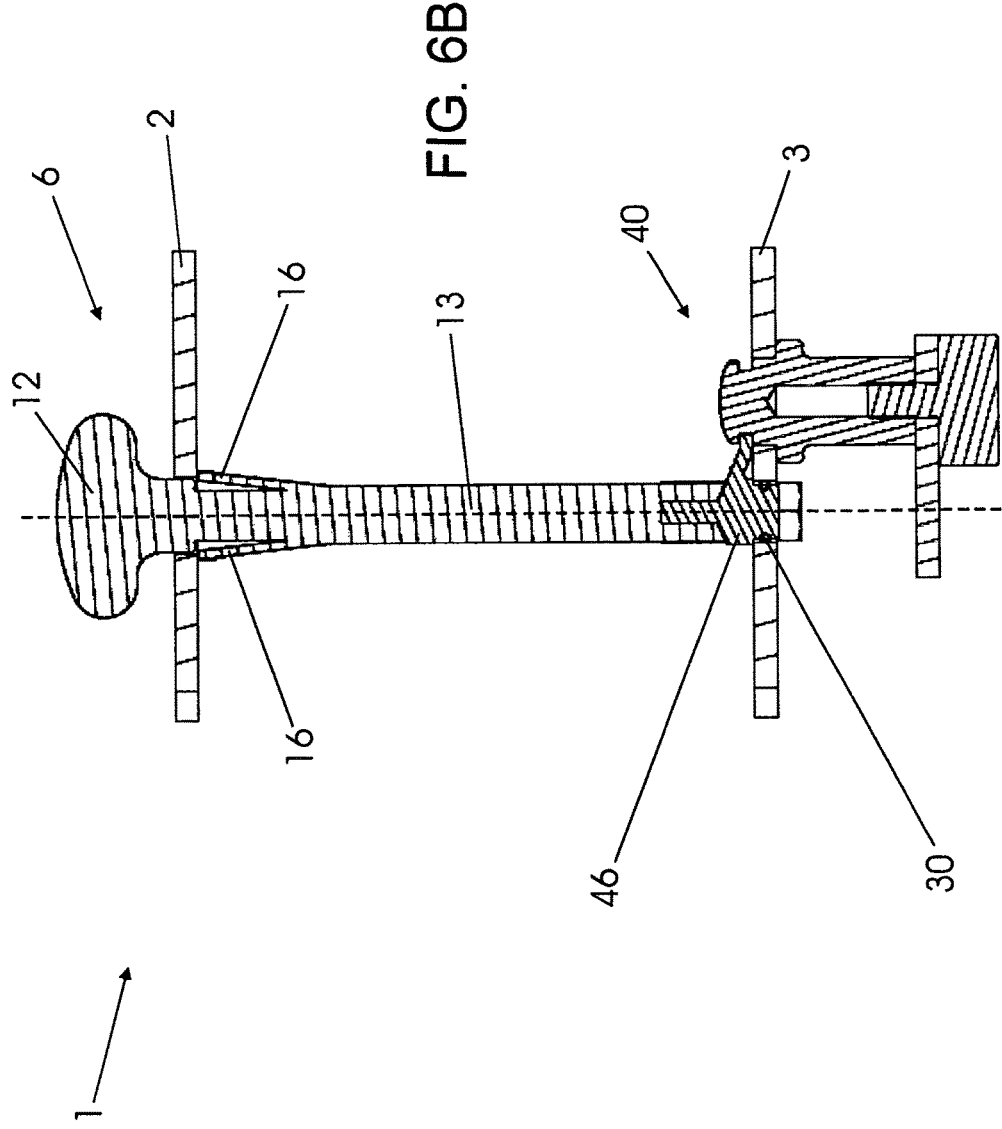

BOTTLE CONVEYOR ARRANGEMENT FOR CONVEYING BOTTLES AND SIMILAR CONTAINERS

CONTINUING APPLICATION DATA

This application is a Continuation-In-Part application of International Patent Application No. PCT/EP2014/077274, filed on Dec. 10, 2014, which claims priority from Federal Republic of Germany Patent Application No. 10 2014 000 052.4, filed on Jan. 8, 2014. International Patent Application No. PCT/EP2014/077274 was pending as of the filing date of this application. The United States was an elected state in International Patent Application No. PCT/EP2014/077274.

BACKGROUND

1. Technical Field

The present application relates to a bottle conveyor arrangement for conveying bottles and similar containers.

2. Background Information

Background information is for informational purposes only and does not necessarily admit that subsequently mentioned information and publications are prior art.

The present application relates to a bottle conveyor arrangement for conveying bottles and similar containers. The present application further relates to a container conveying system comprising a replaceable rail or guide element having an upper and lower rail or guide element level for guiding containers.

Container conveying systems are used, for example, in container treatment plants to guide the containers that are to be treated, for example drinks containers or beverage bottles, through the container treatment plant. For this purpose the system may comprise both rigid rail elements, i.e. rail elements along which the containers glide, or also rotating rail elements, i.e. rail elements in which the containers are conveyed. Such rotating rail elements may form part of a rotating guide or conveyor, such as a star wheel.

Due to the large number of different container types that are usually processed in a container treatment plant, it is necessary or it may be desired for the rail elements that are provided in the container conveying system to be replaceable.

Due to the frequent damage that occurs to the containers, for example glass containers, the rail elements should also be as resilient as possible to resist damage and/or contamination from the drinks or beverages that either leak or spill out of faulty or broken containers, or the glass shards of broken glass containers.

It should also be possible to replace the rail elements rapidly and easily so as to avoid and/or minimize and/or restrict unnecessary or undesired downtime of the container treatment plant for replacing a rail element or for cleaning of the rail element. Beside the actual rail elements, it must or may also be possible to clean their mountings speedily and easily and still essentially guarantee or promote the secure mounting of the rail elements when the container treatment plant is in operation.

Some container conveying systems comprise a mounting in which a locking mechanism in the manner of a bayonet fitting was provided, together with an associated screwed clamping mechanism. Some container conveying systems comprise a mounting in the manner of a mushroom-headed lock through a small pivoting lock arm, while some container conveying systems comprise a locking element for format parts in which a spring-loaded adapter is arranged between control element and format part.

OBJECT OR OBJECTS

An object of the present application therefore is to provide a bottle or container conveying system which has a rail or guide element that resolves the problems referred to above.

SUMMARY

This is achieved by a bottle or container conveying system having the features of the present application. Possible variants of the present application are described herein.

According to the present application, the container conveying system comprises a replaceable rail element for guiding containers having at least one upper and one lower rail element level, a carrier element for carrying the rail element, and a friction mechanism mounted on the rail element and able to rotate about an axis of rotation between at least two positions. In a first position, the friction mechanism secures the lower rail element level with the carrier element in the direction of the axis of rotation, and in a second position, the rail element can be removed from the carrier element in the direction of the axis of rotation. An extraction blocking element for securing the friction mechanism to the rail element is arranged in the direction of the axis of rotation and comprises a locking tab that is configured to engage on the upper rail element level, and can be moved between a lock position and a release position. The rail elements themselves act as glide rails/glide elements along which the passing containers glide, or alternatively such glide rails/glide elements are provided on the rail elements, for example in the manner of an edge protector or guardrail. However, one or a plurality of such glide elements or guardrails may also be mounted in a suitable way on one or a plurality of rail elements, e.g. with ribs or holders.

The present application is based on the realization that the coupling of the rail element to the container conveying system must be or should be effected by way of connection devices, i.e. components, which connect the rail element to the container conveying system and which have as simple a design as possible so as to facilitate a rapid and simple removal and fitting of the rail element, and a possibly simple cleaning of the components. This also means that the friction mechanism provided to effect the coupling must be or should be easy to reach and, in one possible exemplification, manually operable, given that the confined installation spaces often greatly impede the use of additional tools.

One possible exemplification of the container conveying system of the present application is that the forces which occur on the rail element in the direction of the axis of rotation (z-direction) are—at least so far as possible—completely absorbed in the region of the lower rail element level and the carrier element. Thus, the extraction blocking element engaging on the upper rail element remains so far as possible free from forces that act on the rail square or perpendicular or transverse to the direction of the z-axis, and so is in one possible exemplification well protected from damage or malfunctions. It is moreover easy to access because of its position in the region of the upper rail element and, in one possible exemplification, is also operable by hand, i.e. without tools.

The phrase "rail elements," in the context of the present application, should be understood to mean, for example, format parts which are matched to individual drinks containers or beverage bottles. They include rigid moldings on which the containers glide along. They can be either linear, i.e. straight, elements as well as rail elements with a curve. The phrase "rail elements" can also be understood to refer to rotating elements that are "active," that is, rail elements that bring about or participate in a conveying of one or more containers. They include, for example, driven star-shaped rail elements.

Because of the possible heights of the containers, the rail elements comprise at least a plurality of rail element levels which come into contact with the containers, which containers include glass containers or bottles and plastic containers or bottles for containing various liquid products, such as drinks and beverages. The phrase "rail element levels" may be understood to refer to flat components of which an outer edge is appropriately configured for contact with the drinks container. The present application also expressly relates to rail elements which comprise one or a plurality of middle rail element levels in addition to the lower and upper rail element level. In one possible exemplification, a single rail element level may be provided which is usually low relative to, or beneath, the container.

The phrase "ability to rotate of the friction mechanism" is meant that the friction mechanism is able to rotate or be rotated about its own axis of rotation, which is oriented, in one possible exemplification, in the z-direction or along the z-axis of the rail element. The x-axis and y-axis, in at least one exemplification, are defined by a plane in which a planar surface of the rail element lies.

The mounting for the friction mechanism can be effected in the region of the upper rail element level. A mounting is also possible in the region of the lower rail element level. In one possible exemplification, a mounting can also be configured in both the upper and lower rail element level.

The mounting of the friction mechanism can be configured in different ways. Thus, for example, the upper and/or lower rail element level may comprise a recess (which in one possible exemplification is round in configuration), to which the friction mechanism is matched such that the friction mechanism and the recess interact directly. A bearing element may also be provided in the rail element or on the friction mechanism, for example. The bearing element may, for example, be a ball bearing or a bearing disk. The bearing disk and the recess may be configured so as to correspond with one another, with the bearing disk engaging in, for example, the recess, i.e. at the hole edges of the recess.

In the mounted condition, for example, on the rail element, the friction mechanism can assume at least two different positions, namely a first position and a second position. In one possible exemplification, the friction mechanism can be disposed in such a way that it can be rotated forward and back at least between the first and second position. The friction mechanism can also be mounted on the rail element so that it can freely rotate (three hundred sixty degrees).

The phrase "first position," in at least one possible exemplification, should be understood to mean a locking position in which the friction mechanism prevents and/or restricts and/or minimizes the rail element from lifting off the carrier element in the direction of the axis of rotation of the friction mechanism. A mounting or installation of the rail element with a friction mechanism on the carrier element, while the friction mechanism is in the first position, is consequently not possible.

The phrase "second position," in at least one possible exemplification, should be understood to mean an unlocking position in which the rail element can be mounted on and/or dismounted from the carrier element, i.e. in the second position a mounted rail element can be mounted on the carrier element or removed from it in the direction of the axis of rotation (z-axis direction). In one possible exemplification, there is an angle of rotation of approximately ninety degrees between the first position, i.e. the locking position, and the second position, i.e. the unlocking position, and there can also be, for example, two locking positions and two unlocking positions which alternately comprise an angle of rotation of ninety degrees relative to one another.

The friction mechanism can also be mounted such that it is free to rotate, i.e. through an angle of three hundred sixty degrees, and be able to assume at least the first and second position.

The securing of the lower rail element level to the carrier element by way of the friction mechanism is effected in one possible exemplification by a form-fit or friction fit. For this purpose the friction mechanism can be configured either with clearance or without (i.e. for a tight fit) and also exercise a clamping force between one rail element level (e.g. the lower) and the carrier element.

The phrase "carrier element," in at least one possible exemplification, should be understood to mean a component of the drinks conveying system on which a rail element is vertically supported, in the z-axis direction at least.

The extraction blocking element is a component on the friction mechanism which can prevent and/or restrict and/or minimize a detaching or removing of the friction mechanism from the rail element in the direction of the axis of rotation and, in one possible exemplification, in an upwards or vertical direction.

For this purpose, the extraction blocking element comprises at least one locking tab that is configured to engage in the upper rail element level. The term "engage," in at least one possible exemplification, should be understood to mean, for example, the bracing of the locking tab on a surface of the upper rail element level. Thus, for example, the locking tab can comprise a support face, which support face, when in the lock position, is in contact with the underside of the upper rail element level. Also, the locking tab can additionally, or in an alternative exemplification, be in contact, for example, with the top of the upper rail element level or an edge of a recess in the upper rail element level when the locking tab is in the lock position.

As an alternative to the arrangement of one locking tab, two or more locking tabs, for example, can be provided, which are disposed on the friction mechanism diametrically about the latter's axis of rotation. A secure fixing of the friction mechanism to the rail element is made possible as a result. The phrase "lock position," in at least one possible exemplification, should be understood to mean the position in which the removal of the friction mechanism from the rail element, at least upwards and/or in the direction of the axis of rotation, is blocked. Accordingly, the friction mechanism can be removed from the rail element in the release position.

The extraction blocking element and/or, in one possible exemplification, the locking tab, can be configured, for example, as a single piece with the friction mechanism or with a component of the friction mechanism.

The extraction blocking element is therefore configured for a possibly rapid dismantling of the friction mechanism from the rail element, for example, in order to clean the latter, and, in one possible exemplification, comprises a quick-release fastener.

The locking tab can be moved in different ways. A rotary or screwing motion in order to move the locking tab between the locked and the release position would be conceivable, for example. According to one exemplification of the present application, the locking tab can move square to the axis of rotation. In other words, the direction of motion of the locking tab to move from the lock position to the release position or from the release position to the lock position is perpendicular or essentially perpendicular to the axis of rotation, i.e. it runs roughly at an angle of ninety degrees to the axis of rotation, or runs substantially perpendicular or transverse to the axis of rotation.

The locking tab can be mounted in different ways for this purpose. It can be mounted centrally in a guide, for example. In one possible exemplification, however, the locking tab is arranged with a first end at the friction mechanism, and a second end opposite the first end is configured as a free end. Consequently, the locking tab can be connected by its first end with the friction mechanism, while the second end is unconnected in configuration. In the case of a locking tab that is configured in this way that is also moveable square to the axis of rotation, the free end can move over a circular arc section. The height of the circular arc section is so low, however, that the movement of the free end runs approximately square to the axis of rotation. The phrase "square to the axis of rotation" therefore is also meant trajectories of the free end of the locking tab which run over a circular arc section of minimal pitch.

In order to configure the movement of the locking tab between the lock and release positions in a possibly simple manner, in one possible exemplification the locking tab can be spring-mounted. In this way the free end can be moveable against a bending stress, for example. In one possible exemplification, the spring-mounting can be configured so that the locking tab is moved from the lock position to the release position by an external force against the spring tension, and snapped back from the release position automatically to the lock position.

According to one exemplification of the present application, the locking tab is arranged in such a way that it extends starting from its first end into or through a recess in the upper rail element level. The first end, for example, can be arranged in the region on or beneath the underside of the upper rail element level, i.e. between the upper and lower rail element level, and extend with its second end in the direction of the upper rail element. The first end of the locking tab is arranged, in one possible exemplification, above the top of the upper rail element level however, and the second end extends into/through the lower rail element level.

According to one exemplification of the present application, the friction mechanism is configured in a plurality of parts and comprises a friction body, a friction head and/or a friction foot. The friction body bridges the distance between the upper rail element level and the lower rail element level at least partly. The friction head and friction body can be a single piece, while the friction foot can be connected to the friction body as a separate component. It is also possible, for example, for the friction body and the friction foot to be a single piece and for the friction head to be separate. Alternatively, the friction head and the friction foot can each be configured separately from the friction body and be connectable to it.

For a possibly simple configuration, the friction body at least is planar in configuration. Alternatively, the friction head and/or friction foot may also be planar in configuration, possibly if they form a single piece with the friction body. Due to its planar configuration, the friction body can be produced substantially accurately from a plate-shaped structure, in one possible exemplification from a metal panel.

In the case of a multi-part configuration of friction body, friction head and/or friction foot, the respective connection between these parts can be effected by way of clamping or a form-fit. The friction head may also be able to be snapped on or similarly connected to the friction body, for example. A separately configured friction foot, in one possible exemplification, can be connected to the friction body, for example by a connection device which comprises, for example, a detent link on the friction body or friction foot, and is designed to snap into a corresponding detent element.

According to one exemplification of the present application, the friction mechanism comprises an anti-rotation device preventing unintended rotation about the axis of rotation. The anti-rotation device can be configured to inhibit an inadvertent rotary movement of the friction mechanism in the first position and/or in the second position. The anti-rotation device is, in one possible exemplification, designed to prevent and/or restrict and/or minimize rotation caused by vibrations which occur while the container conveying system is in operation.

The anti-rotation device can completely inhibit a rotary movement. Alternatively or in addition, it can significantly impede the twisting of the friction mechanism so that, for example, the forces occurring during operation are not strong enough to cause the friction mechanism to twist.

In one possible exemplification of the present application, for the complete blocking of the rotary movement, it is possible for the anti-rotation device to comprise a detent element having a correspondingly formed detent element mount into which the detent element is able to engage. A bolt element which engages in a recess or is in contact with a projection, for example, can be configured for this purpose. The locking tab, in one possible exemplification, comprises the detent element, and the recess in the upper rail element level comprises the detent element mount.

The locking tab can therefore have a dual function in that on the one hand it prevents and/or restricts and/or minimizes and/or impedes the twisting of the friction mechanism about the axis of rotation and so acts as a detent element, and on the other hand it blocks the extraction of the friction mechanism from the rail element in the first and/or second position, i.e. it acts as an extraction blocking element. The recess comprises indentations that, in one possible exemplification, are configured as a detent element mount, and in which the locking tab, i.e. the detent element, can engage.

In the possibly circular recess, the indentations are arranged symmetrically, and in one possible exemplification at equal distances apart from one another. The indentations can be arranged, for example, at a distance of ninety degrees, i.e. crosswise, at the recess. In one possible exemplification, those sections of the recess between the indentations are still configured for the pivot bearing of the friction mechanism.

Alternatively, or in addition, and as already mentioned above, the necessary and/or desired adhesive force between the friction mechanism and the rail element, for example, can be increased so as to constitute an anti-rotation device. According to one exemplification of the present application, a clamping device configured as a clamping ring is provided for this purpose. In the case of a round recess, for example, of a round bearing of the friction mechanism, the latter can be configured, for example, as an elastic O-ring. The latter increases the adhesive force between the friction mechanism and the rail element, and/or the upper rail element level and/or the lower rail element level. Consequently, the clamping device thus configured increases the force required and/or desired for rotation such that any inadvertent twisting, such as while the container conveying system is in operation, is prevented and/or restricted and/or minimized, yet the friction mechanism can still be moved from the first to the second or from the second to the first position, for example, manually without additional tools by an operator.

For the securing of the rail element to the carrier element in the direction of the axis of rotation, one exemplification of the present application provides for the friction mechanism to comprise a bolt element which in the first position effects a form-fit connection to the carrier element.

This securing is effected at least in the removal direction of the rail element, i.e. for example upwards in the direction of the axis of rotation. The bolt element is configured in such a way that it is designed at least to engage in another component or to encompass one or a plurality of components. Consequently, a bolt element is understood to be a structure which comes into contact with the carrier element and which together with it prevents and/or restricts and/or minimizes the rail element being removed from the carrier element in the direction of the axis of rotation.

In one possible exemplification of the present application, the bolt element comprises an upper friction lug and a lower friction lug, with the upper friction lug being configured and disposed to engage in the top of the lower rail element level, and the lower friction lug to engage in the underside of the carrier element.

The phrase "friction lug," in at least one possible exemplification, should be understood to mean a projection protruding out from the friction mechanism, or from the friction body/friction foot, or a recess introduced into the friction mechanism, or into the friction body/friction foot. The upper friction lug is configured and disposed in such a way that, in the first position, it is in contact with the top of the lower rail element by a section oriented to the lower friction lug, whereas the lower friction lug is configured and disposed in such a way that it is in contact with the underside of the carrier element by a section oriented to the upper friction lug. The friction lugs are configured in one possible exemplification as a single piece with the friction body or friction foot.

The lower rail element level and the carrier element, which in one possible exemplification are both plate-like, i.e. planar in configuration, are consequently secured between the upper and the lower friction lug. The lower rail element level and the carrier element can therefore be interlocked by the friction lugs. Tension-free securing may also be effected however, for example by way of a backlash-free fit. The phrase "backlash-free fit," in at least one possible exemplification, should be understood to mean that the friction mechanism prevents and/or restricts and/or minimizes movement of the rail element away from the carrier element in the direction of the axis of rotation, but does not transmit any or essentially any clamping pressure to the lower rail element level and carrier element.

As already mentioned above, the securing between the carrier element and lower rail element level is therefore configured in one possible exemplification as a form-fit connection.

One possible exemplification of the securing is that the operating person can operate the friction mechanism manually without tools. This applies in one possible exemplification to a backlash-free configuration. It is also possible here if the friction lugs are configured to be relatively short, for example, in the region of five millimeters or less. One possible exemplification of stable securing is achieved if, in addition to an upper and a lower friction lug, a second upper friction lug and second lower friction lug are disposed such that each is arranged diametrically about the axis of rotation. The friction foot can therefore comprise two diametrically opposed friction claws, each of whose claw-like openings is oriented square to the axis of rotation and pointing away from the axis of rotation, and, when the mechanism is in the first position, create a form-fit connection between the carrier element and the lower rail element level.

Alternatively or in addition to the upper and/or lower friction lug, the bolt element comprises a friction bolt or a friction clamp. Like the friction lugs, the friction bolt is rotatable with the friction mechanism, i.e. with a friction body, about the axis of rotation. However, unlike the friction lugs, it is not configured as a projection or recess, but in one possible exemplification as a separate structure which is provided with multiple parts on the friction body/friction foot. The friction bolt, in one possible exemplification, is of a length greater than that of a friction lug, i.e. the distance between its free end and the axis of rotation is greater than with the friction lugs.

The friction clamp is also, in one possible exemplification, connected to a friction body as a separate structure. The friction clamp may also be configured as a friction foot for example. In one possible exemplification, the friction clamp comprises two arms configured to engage on the carrier element.

In one possible exemplification of the present application, the friction clamp comprises two free ends pointing to one another and/or aligned square to the axis of rotation. It should be understood that, in one possible exemplification, the free ends comprise two end faces or sections that point to one another, and which, in the mounted position, are arranged diametrically about the axis of rotation.

In order to achieve a relatively simple securing of the friction bolt or friction clamp, the latter are configured, in one possible exemplification, to engage in a recess in the carrier element. To this end, one exemplification of the present application proposes that the friction bolt and/or friction clamp are each configured to correspond to a groove provided on the carrier element.

The arrangement of the groove on the carrier element can be effected in different ways and depends on the orientation of the friction bolt. In case of a friction mechanism which for example extends through the lower rail element level and in which the friction bolt or friction clamp is arranged below the lower rail element level, this groove may also be provided in a region of the carrier element which in the mounted position is arranged below the lower rail element level. The groove is, in one possible exemplification, arranged above the top of the lower rail element level. In other words, whether or not the friction mechanism extends through the lower rail element level, the friction bolt is arranged between the upper and lower rail element level, with the groove being arranged on a section of the carrier element which extends through the lower rail element level into the region between the lower and the upper rail element level.

The groove can fully encircle the carrier element for example. The groove may also encircle sections of the carrier element or be configured as a recess or hole. The cross-section of the groove can be configured in any desired way.

The groove, in one possible exemplification, is also configured as an anti-rotation device when a friction clamp is used. To this end the groove comprises an oval or cornered, such as square or rectangular, basic form, i.e. in horizontal cross-section it is configured to match the forms listed above. In one possible exemplification, when configured with a cornered form, the groove comprises at least four sections which abut one another at angles, with at least two sections lying at least partially diametrically opposed to one another, and with the distance of two diametrically opposed angle corners being greater than or equal to the distance between two diametrically opposed faces. The friction clamp therefore, in one possible exemplification, is configured and arranged so that during a movement between the first and second position, it is deflected square to the axis of rotation. The phrase "square to the axis of rotation," in at least one possible exemplification, should be understood to mean, in the context of the above statements, a movement which takes place over a path having the form of a slightly curved arc of a circle.

The friction clamp may differ in configuration, i.e. it may, for example, undergo deflection during the movement from the first to the second position, and remain in that deflected attitude in the second position. Alternatively, the friction clamp may, for example, be deflected when overcoming the anti-rotation device, and be in the same attitude both in the first position and in the second position, i.e. for example, with no deflection.

Glass breakage can occur in the container conveying system, such as when glass containers or glass bottles are being conveyed. The shards or splinters which occur when this happens must be or should be removed from the device to allow operation to continue. This often involves dismantling the rail elements and re-assembling them as quickly as possible to essentially guarantee and/or promote safe and continuous operation. Such a situation can be problematic in that small splinters can enter the friction mechanism and the friction mechanism can no longer be reliably operated, and/or the friction mechanism cannot be turned from the first to the second position without some difficulty. To prevent and/or restrict and/or minimize this from happening, according to one exemplification of the present application, provision is made for the friction mechanism to comprise at least one splinter guard.

The splinter guard may be planar in configuration and, in one possible exemplification, may cover the region of the rail element level through which the friction mechanism passes. The splinter guard may be configured as a separate structure, for example as an annular structure. The splinter guard, in one possible exemplification, may be arranged on the top of the lower and/or upper rail element level.

The splinter guard may also be connected, for example, to the friction mechanism, such as detachably or permanently or substantially permanently connected, so that when the friction mechanism is removed, the splinter guard is removed with it. To this end, a lower splinter guard is provided, in one possible exemplification, in the region of the upper friction lugs; the splinter guard covers the recess or opening in the lower rail element level, through which the lower friction lugs are passed on assembly. This prevents and/or restricts and/or minimizes glass shards, splinters, dust or other contaminants being able to enter the region of the lower friction lugs or of the carrier element from above.

Alternatively or in addition to this, the friction head, for example, may also comprise an upper splinter guard. Like the lower splinter guard, the upper splinter guard can be configured as a separate component or for example constitute a single item together with the friction mechanism or friction head. The upper splinter guard too is configured in such a way that entry by, for example, glass splinters or similar contaminants, into the bearing region of the friction mechanism at the upper rail element level, is prevented and/or restricted and/or minimized or made difficult. Safe rotary movement of the friction mechanism and, in one possible exemplification, also safe movement of the locking tab on the friction mechanism, is therefore possible even after a glass breakage.

As well as the friction mechanism which facilitates a securing of the rail element on the carrier element in the direction of the axis of rotation, a positioning device for securing the rail element square to the direction of the axis of rotation is also provided according to one exemplification of the present application. Thus the positioning device is provided in order to absorb all or most, or at least many, of the forces which occur square to the axis of rotation, i.e. in an x-y-plane of the rail element.

The positioning device can be configured as a separate structure and constitute a further connection between the container conveying system and the rail element. According to one exemplification of the present application, however, the positioning device is disposed on the carrier element. This facilitates a possibly simple design configuration which can also be economically manufactured.

The positioning device is in one possible exemplification configured so that it engages in the rail element. In one possible exemplification of the present application, it is possible for the positioning device to comprise at least one locating stud and a stud mounting corresponding to the locating stud, with the stud mounting being arranged, in one possible exemplification, on the lower rail element level, and the locating stud, in one possible exemplification, on the carrier element. The positioning device can be configured, for example, as a stud which extends in the direction of the axis of rotation, and which can be inserted into a stud mounting that is configured as a hole. The locating stud may, in one possible exemplification, also be configured as a section on the carrier element, again making a possibly simple design arrangement possible in consequence.

The stud and the stud mounting comprise, for example, a circular cross-section which is also as large as possible so as to distribute the acting forces, in one possible exemplification, effectively such that the area of the hole's inner surface can be reduced through the reduction of the material stress due to lower compressive stresses. The positioning device can be configured and arranged to allow the rail element to be fitted vertically, i.e. parallel or substantially parallel to the axis of rotation, as a result of which a possibly simple mounting/dismounting of the rail element is facilitated, and, in one possible exemplification, any existing glass splinters do not impede the mounting/dismounting of the rail element.

In one possible exemplification, the positioning device is disposed in such a way that the axis of rotation of the friction mechanism stands vertically above a centerline, i.e. the axes lie one above the other, of the positioning device, such as a positioning device comprising a locating stud and a stud mounting. As a result, any or substantially any transverse forces which occur are absorbed possibly reliably by the positioning device because little to no additional bending forces can arise between the section of the positioning device and the section of the friction mechanism and of the carrier element.

The carrier element may also be configured in different ways. The carrier element can, for example, be configured in the form of a plate having a recess or hole through which the friction mechanism extends and engages, for example, by way of the friction claw or friction lugs. Alternatively a friction bolt, for example, may also engage on the underside of a plate-shaped carrier element.

According to one exemplification of the present application, however, the carrier element comprises at least one mounting leg. The mounting leg is configured to be in contact with the friction lugs, the friction bolt and/or the friction clamp. To facilitate a possibly reliable securing of the friction mechanism, in one possible exemplification, two mounting legs are also configured which can be arranged diametrically opposite one another and, for example, extending square to an axis of rotation, such that, for example, diametrically disposed friction lugs are in contact with the mounting legs at the same time.

The mounting legs can be curved and point toward one another each with a free end. A rotation limit stop is also, in one possible exemplification, configured at one free end of the mounting leg. For example, a rotation limit stop which stops the rotary movement in the first position can be configured on a first mounting leg, and a rotation limit stop which stops the rotary movement of the friction mechanism in the second position can be configured on the second mounting leg.

Alternatively or additionally, a rotation limiter arranged in the region of the friction head also comprises rotation limiting stops. Here, a friction head comprises a rotation lock that is configured to match a curved slot arranged in the upper rail element level. The rotation lock can be rotated together with the friction mechanism from the first to the second position and back. As soon as it reaches the first or second position, the rotation lock comes up against an end stop or rotation limit stop of the curved slot, and so prevents and/or restricts and/or minimize further rotation.

As already described above, the rail element comprises two or more rail element levels. The lower rail element level and the upper rail element level are, in one possible exemplification, identical or substantially identical in configuration, thereby significantly reducing the number of different components. It is also possible, for example, to use the rail elements mirror-symmetrically, i.e. they can be used for both a counter-clockwise and for a clockwise system, thereby reducing production costs.

Rail elements, or rotary rail elements, may also be configured from at least two rail element segments each comprising connecting sections which correspond with one another, and with these connecting sections being connected to one another by a form-fit in the direction square to the axis of rotation. Here a plurality of rail element segments, when assembled, form, for example, one rotary rail element. The connecting sections can be configured as puzzle connections, i.e. they comprise for example a peg rib or tab having, for example, a round peg head, and recesses which are configured to match the peg head and the peg rib. This facilitates a mounting/dismounting in the direction of the axis of rotation, and in the mounted condition prevents and/or restricts and/or minimizes relative movement of the connected rail element segments to one another in a plane square to the direction of the axis of rotation.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 5B shows a schematic perspective view of the friction mechanism of FIG. 5A;

FIG. 6A shows a schematic perspective view a partial section of a rail element with a fourth alternative exemplification of a friction mechanism in the first position;

FIG. 6B shows a schematic perspective view the friction mechanism of FIG. 6A in cross-section;

DESCRIPTION OF EXEMPLIFICATION OR EXEMPLIFICATIONS

Figure 1:
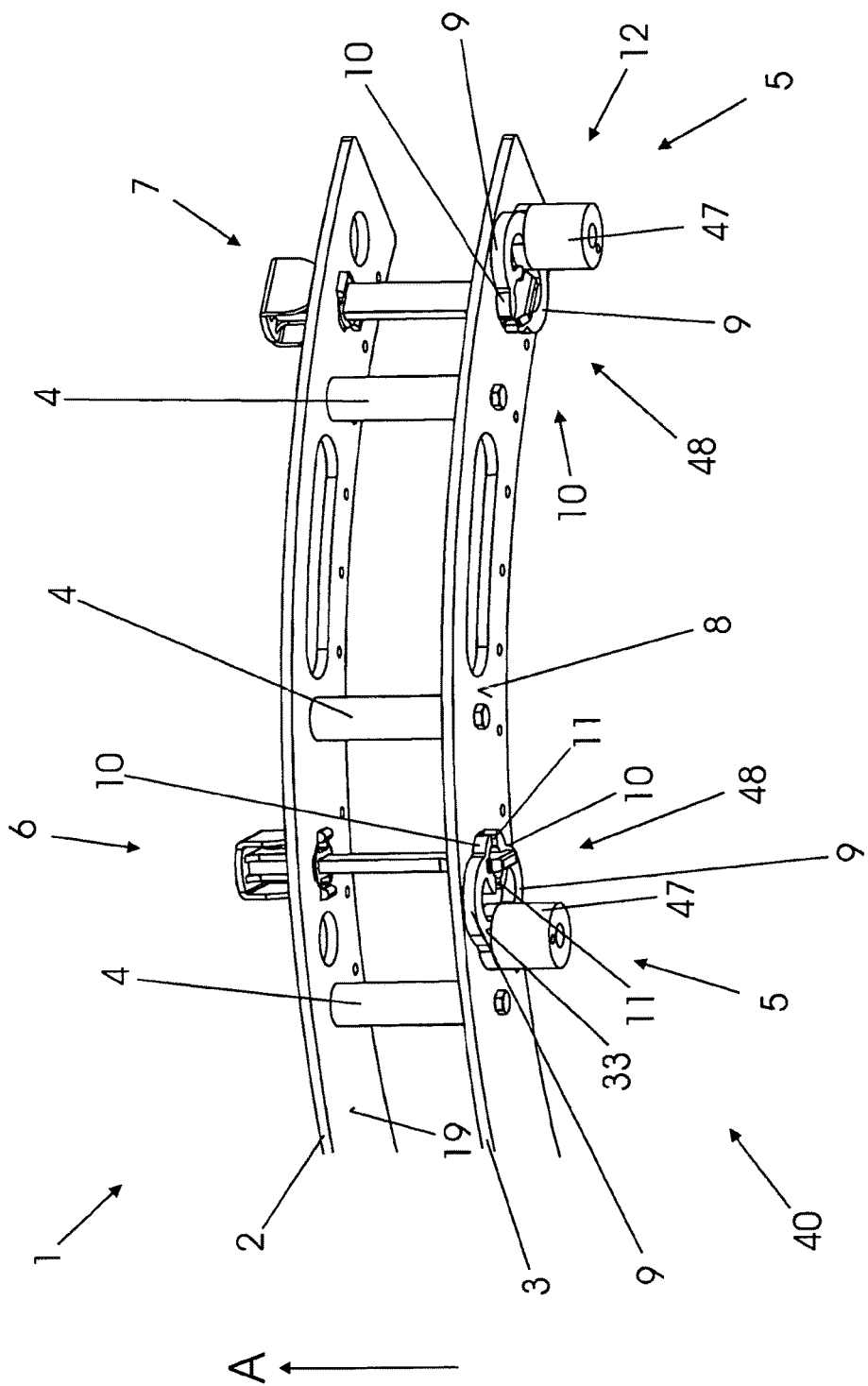
FIG. 1 shows a schematic perspective view of a partial section of a rail or guide element having a friction mechanism or connecting device in a first position and a friction mechanism or connecting device in a second position.

FIG. 1 shows schematically in a perspective view a partial section of a rigid rail element 1, that is, a guide structure or guide element, for the guiding of containers (not shown here). Rail element 1 comprises an upper rail element level 2, or upper guide element, and a lower rail element level 3, or lower guide element, which are interconnected by a spacer 4. Rail element 1 is mounted on a carrier element 5. As previously stated, the rail elements act as glide rails/glide elements along which the passing containers glide, or alternatively such glide rails/glide elements are provided on the rail elements, for example in the manner of an edge protector or guardrail. However one or a plurality of such glide rails/glide elements or guardrails may also be mounted in a suitable way on one or a plurality of rail elements, e.g. with ribs or holders. Such glide rails/glide elements are for example formed from or coated with a suitable plastic. Such separate glide rails/glide elements are not shown or described in any greater detail hereinafter but they can be provided in all stated exemplifications depending on the conveying task or the containers that are to be conveyed.

Two identically configured or substantially identically configured friction mechanisms 6, 7, or connecting devices, are also provided which secure rail element 1 to carrier element 5 in an upward direction of the axis of rotation A (as indicated by an arrow). Here a first friction mechanism 6 is depicted in its first position, i.e. it secures rail element 1 to carrier element 5, while a second friction mechanism 7 is depicted in its second position, i.e. rail element 1 with friction mechanism 7 could be removed from carrier element 5. Thus first friction mechanism 6 secures rail element 1 in the direction of the axis of rotation A on carrier element 5, while second friction mechanism 7 does not secure rail element 1 and does not block a removal of rail element 1. The friction mechanism 6, 7, that is, the connecting device, is elongated and the axis of rotation A runs along the length thereof. The connecting device 6, 7 is therefore rotatable about its length.

Carrier element 5 is made of a plurality of parts, and comprises a carrier peg 47 which in this case is round in configuration, and a carrier clasp 48 which is disposed on carrier peg 47 and whose top (not shown here) is in contact with an underside 8 of lower rail element level 3.

In this exemplification carrier clasp 48 comprises two curved mounting legs 9 whose free ends 10 are aligned and arranged pointing to one another. Free ends 10 of mounting legs 9 are each provided with a rotation limit stop 11. Rotation limit stops 11 limits the ability of friction mechanism 6, 7 to rotate, i.e. a first rotation limit stop 11 stops friction mechanism 6, 7 as soon as the latter is in its first position, while second rotation limit stop 11 stops friction mechanism 6, 7 as soon as the latter is in its second position.

Figure 2:
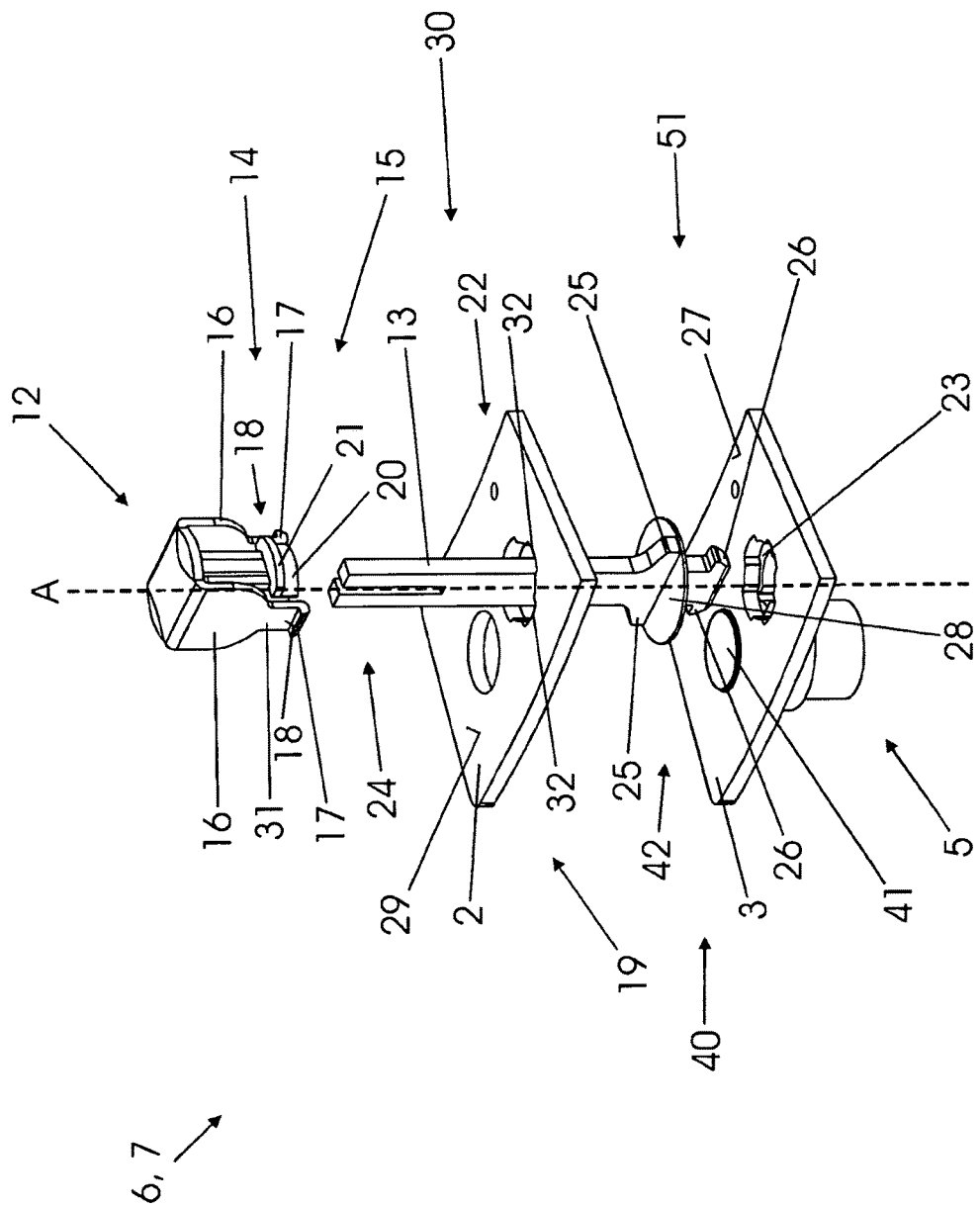
FIG. 2 shows a schematic perspective exploded view of the friction mechanisms of FIG. 1.

Friction mechanism 6, 7 is arranged on rail element 1 and in this case comprises two pieces. As shown in FIG. 2, it comprises a friction head 12 and a friction body 13 designed so it can be snapped into a mount 14 configured on friction head 12.

Friction head 12 is configured as a gripper element and comprises an extraction blocking element. Extraction blocking element 15 comprises two locking tabs 16 arranged diametrically opposite one another about an axis of rotation A of friction mechanism 6, 7.

Locking tabs 16 each comprise a free end with a locking lug 17. Locking lugs 17 comprise a support face 18 arranged and configured to support the underside (see FIG. 1) of upper rail element level 2. In the mounted condition (see FIG. 1) support faces 18 are supported in both the first and second position on underside 19 of upper rail element level 2 and prevent and/or restrict and/or minimize the extraction of friction head 12 or friction mechanism 6, 7 from rail element 1.

Locking tabs 16 are permanently or substantially permanently connected to a main body of friction head 12 by the end which lies opposite free end 17. Consequently the locking tabs are spring mounted and can be moved out of their depicted position in a direction B (see FIG. 3) square to the axis of rotation A. In one possible exemplification they can be moved towards axis of rotation A, i.e. locking tabs 16 can for example be pressed together by hand. In other words, the locking tabs 16 are deformable in order to move an end portion of the locking tabs 16 between an engaged position and a disengaged position. Even if the trajectory of locking tabs 16 takes them along a circular arc section, this movement is understood to be a movement square to axis of rotation A. It should be noted that the direction B lies in a plane perpendicular, or square, to the axis of rotation A. In at least one possible exemplification, the plane in which direction B lies is parallel to a surface of the rail element 1, such as an upper surface 29 of upper rail element 2 (see FIG. 2). This plane can be viewed as containing or defining an x-axis and a y-axis, and the axis of rotation A can be viewed as the related z-axis. It should be understood that the plane and direction B lying therein may be perpendicular or essentially perpendicular to the axis of rotation A, or may even be substantially perpendicular or transverse to the axis of rotation A. However, in the exemplifications shown in the figures, direction B is perpendicular to axis A.

A bearing guide 20 and a splinter guard, in this case an upper splinter guard 21, are also arranged on friction head 12. In the mounted condition, upper splinter guard 21 covers an upper recess 22 in upper rail element level 2 so that the entry of foreign bodies into the region of bearing guide 20 of friction head 12 or into the region of an anti-rotation device 30 is prevented and/or restricted and/or minimized.

Bearing guide 20 is matched to recess 22 in upper rail element level 2 which is identical is configuration to a recess 23 in lower rail element level 3.

While friction head 12 comprises a plastic injection molding, friction body 13 is formed from a plate-shaped metal, i.e. friction body 13 is planar in configuration. The end of friction body 13 that is configured for the fitting of friction head 12 comprises a mounting slit 24 that is configured to receive a pin (not shown here) that is provided on friction head 12. An improved accuracy of fit of the friction head mounted on friction body 13 is achieved by mounting slit 24 and the pin. An anti-rotation effect between friction head 12 and friction body 13 is also brought about.

At the end of friction body 13 lying opposite friction head 12, a friction foot 51 is configured as a single piece with friction body 13 and so is also planar in shape.

Friction foot 51 comprises two upper friction lugs 25 and two lower friction lugs 26. Upper friction lugs 25 and lower friction lugs 26 are diametrically opposed to one another about axis of rotation A. Upper friction lugs 25 are configured so as to be in contact with top 27 of lower rail element level 3, while lower friction lug 26 is configured to engage in an underside 33 (see FIG. 1) of carrier element 5. Adjacent to upper friction lugs 25 and arranged between upper and lower friction lugs 25, 26 is a lower splinter guard 28 which is configured to be flat and round and which when assembled covers recess 23 in lower rail element level 3. Lower splinter guard 28 therefore prevents and/or restricts and/or minimizes foreign bodies from entering the region of the securing of rail element 1 to carrier element 5.

During assembly, friction body 13 is guided through recess 22 in upper rail element level 2. Friction head 12 is fitted with its recess 14 onto friction body 13. Both lower friction lugs 26 are then passed through recess 23 in lower rail element level 3, while locking tabs 16 are squeezed together, i.e. moved in the direction of the axis of rotation. The locking tabs are then guided section by section through recess 22 into upper rail element level 2. When locking tabs 16 are released they return to their initial position and support faces 18 are supported off underside 19 of upper rail element level 2, so preventing the removal of friction mechanism 6, 7 from rail element 2.

When assembled therefore, locking tabs 16 extend starting from a region above top 29 of upper rail element level 2 and through recess 22 so that locking tabs 16 partly extend through upper rail element level 2 and, after the pressing force on locking tabs 16 has been removed, locking lugs 17 lie with their support faces 18 on underside 19 of upper rail element level 2.

FIGS. 1 and 2 also show anti-rotation device 30. For this purpose locking tabs 16 comprise detent elements 31, and recess 22 in upper rail element level 2 provides detent element mounts 32 which are configured to match detent elements 31.

Four detent element mounts 32 are arranged offset at ninety degree angles in recess 22 and are aligned to friction mechanism 6, 7 in such a way that detent elements 31 engage in detent element mounts 32 both in the first position of friction mechanism 6, 7 and in its second position. In both the first and second position of friction mechanism 6, 7 therefore, the extraction of friction mechanism 6, 7 and in one possible exemplification of friction head 12 from recesses 22, 23 and hence from rail element 1 is inhibited on the one hand, while on the other a twisting of friction mechanism 6, 7 is prevented and/or restricted and/or minimized.

Friction mechanism 1 cannot be removed, for example, from a dismounted rail element 1 until locking tabs 16 are pressed together in the direction of axis of rotation A, and support faces 18 disengage from underside 19 of the upper rail element level as a result.

FIGS. 1 and 2 also show a positioning device 40 which absorbs forces that occur square to axis of rotation A at rail element 1. Positioning device 40 comprises a locating stud 41 which is arranged on carrier element 5 and which extends through a hole in lower rail element level 3 which is configured as a stud mounting 42. Stud mounting 42 and locating stud 41 are configured to fit one another closely. Rail element 1 can be mounted with stud mounting 42 onto the locating stud vertically, i.e. in the direction of the axis of rotation A.

Figure 3:
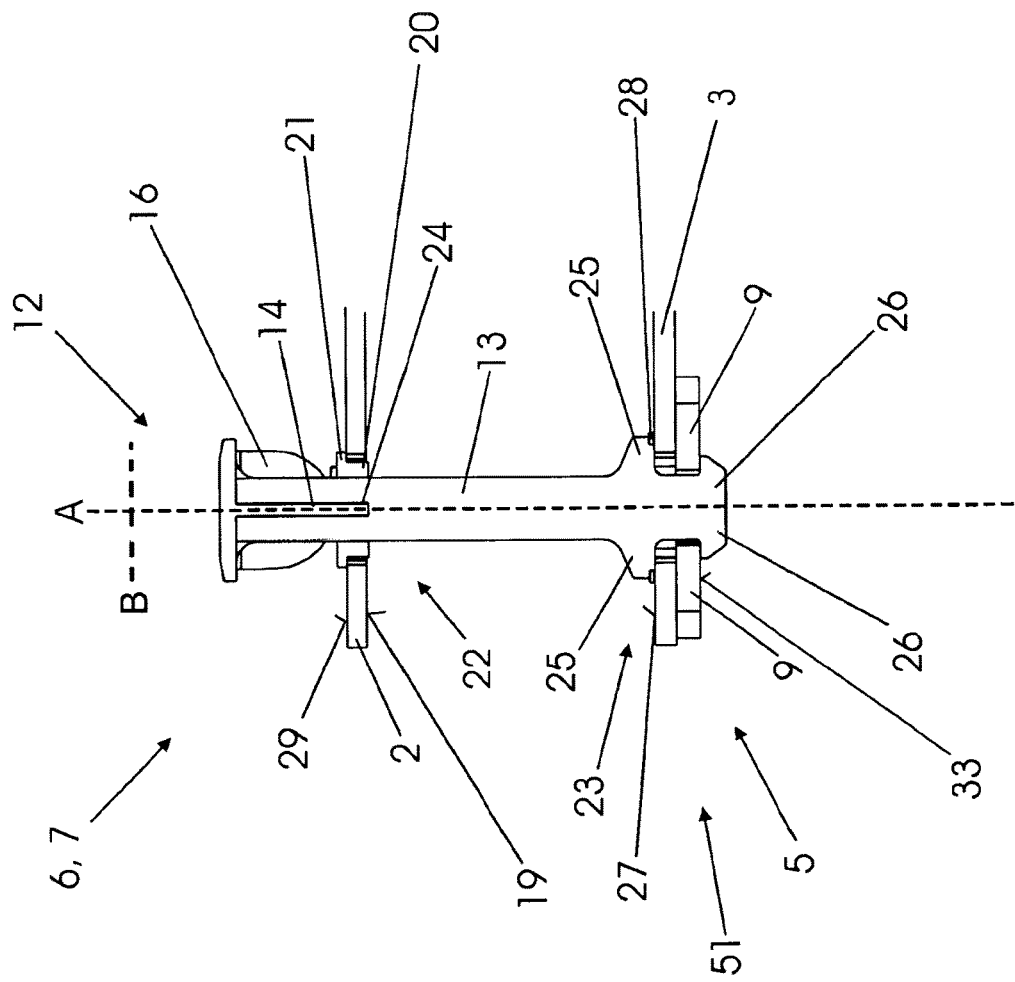
FIG. 3 shows the friction mechanism of FIGS. 1 and 2 schematically in cross-section.

FIG. 3 shows the friction mechanism 6, 7 of FIGS. 1 and 2 in cross-section and in its first position. Friction head 12 together with its mount 14 is plugged into the mounting slit on friction body 13. Bearing guide 20 is arranged in recess 22 and facilitates a circular rotary movement of friction mechanism 6, 7. Upper splinter guard 21 covers at least part of recess 22 and so prevents and/or restricts and/or minimizes ingress of foreign bodies. Locking tab 16 extends from the region of top 29 of upper rail element level 2 through recess 22 so that support face 18 lies against locking lug 17 on underside 19 of upper rail element level 2 and prevents and/or restricts and/or minimizes the removal of friction head 12 upwards in the direction of axis of rotation A. Detent element 31 is also engaged in a detent element mount 32 and prevents and/or restricts and/or minimizes friction mechanism 6, 7 from turning.

In the region of friction foot 51, upper friction lugs 25 are in contact with top 27 of lower rail element level 3 while lower friction lugs 26 are in contact with underside 33 of carrier element 5. In other words, lower friction lugs 26 are in contact with free ends 10 of mounting leg 9. An upper friction lug 25 and the lower friction lug 26 which is arranged immediately or substantially immediately beneath said upper friction lug 26 in the direction of the axis of rotation therefore connect lower rail element level 3 with carrier element 5 in a form-fitting manner. The distance between upper friction lug 25 and lower friction lug 26 can be selected so that it is an exact or substantially exact fit, i.e. free from backlash. An edge of lower rail element level 3 or of carrier element 5, for example, can also be beveled or chamfered and the distance between lower friction lug 26 and upper friction lug 25 can be selected as being slightly less than the height of superimposed lower rail element level 3 and carrier element 5. A rotary motion of friction mechanism 6, 7 into the first position now causes lower rail element level 3 with carrier element 5 to be braced between upper friction lugs 25 and lower friction lugs 26. The contact face on friction lugs 25, 26 can of course also be chamfered or rounded—at least in sections—so as to achieve a bracing or just a better fit.

In at least one possible exemplification of the present application, when the friction mechanism is turned in combination with a resilient splinter guard 28, e.g. in the form of a pre-bent spring steel plate, these bevels or chamfers make it possible for a backlash-free bracing to be generated. As splinter guard 28 is braced, it lies flat against the top of the upper rail element and in this position provides protection from dirt or shards while at the same time generating a preload between rail element and carrier element.

Lower splinter guard plate 28 ideally exerts or may exert an elastic preload which makes for a backlash-free connection. This does not transmit the actual holding forces however. The holding forces are transmitted by the respective friction foot after the preload force is overcome.

Also shown is lower splinter guard 28 which is in contact with upper friction lugs 25 and completely covers recess 23 in lower rail element level 3, so preventing and/or restricting and/or minimizing foreign bodies from entering the securing region through friction lugs 25, 26.

Figure 4A:
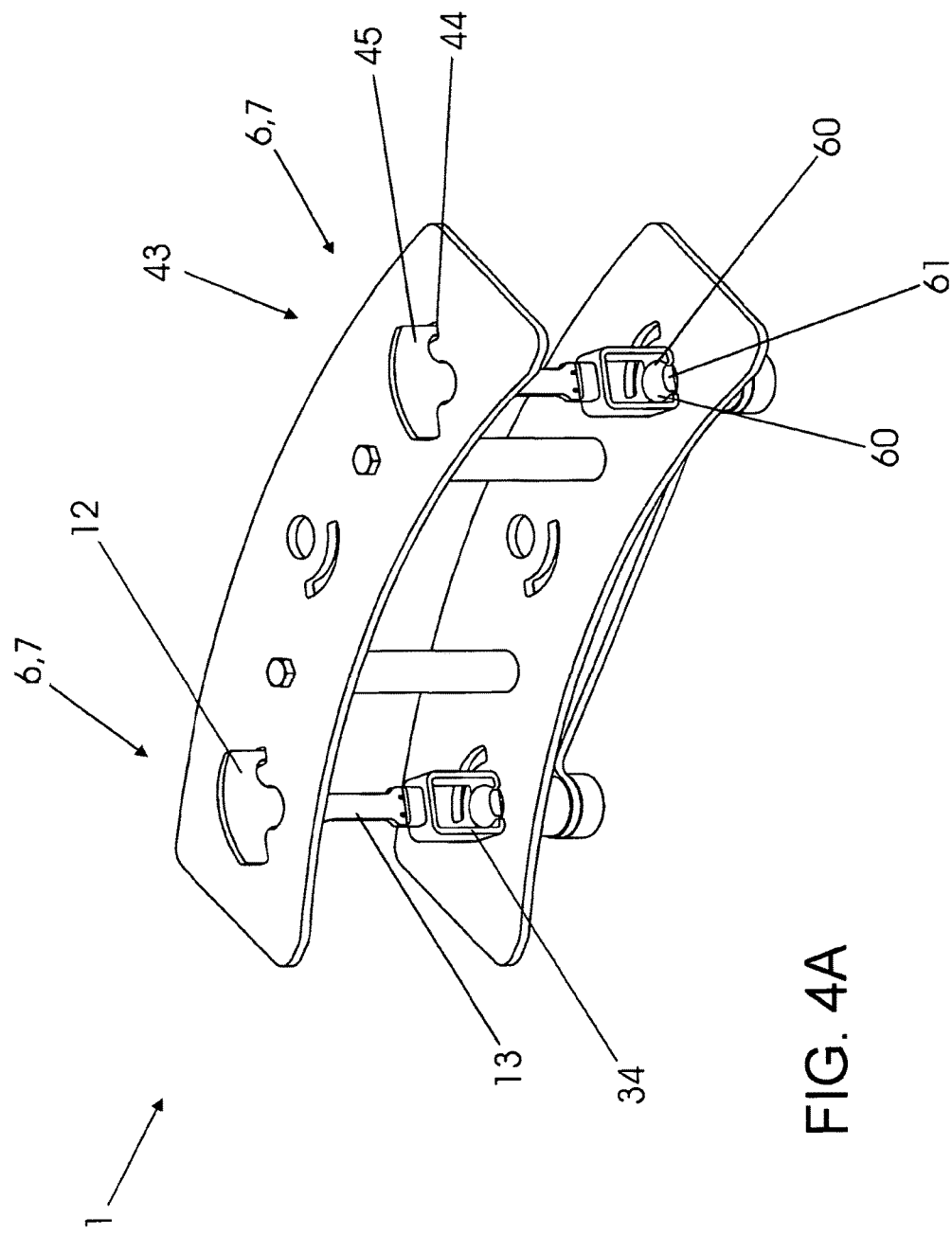
FIG. 4A shows a schematic perspective view of a partial section of a rail element with a further exemplification of a friction mechanism in the first position.
Figure 4B:
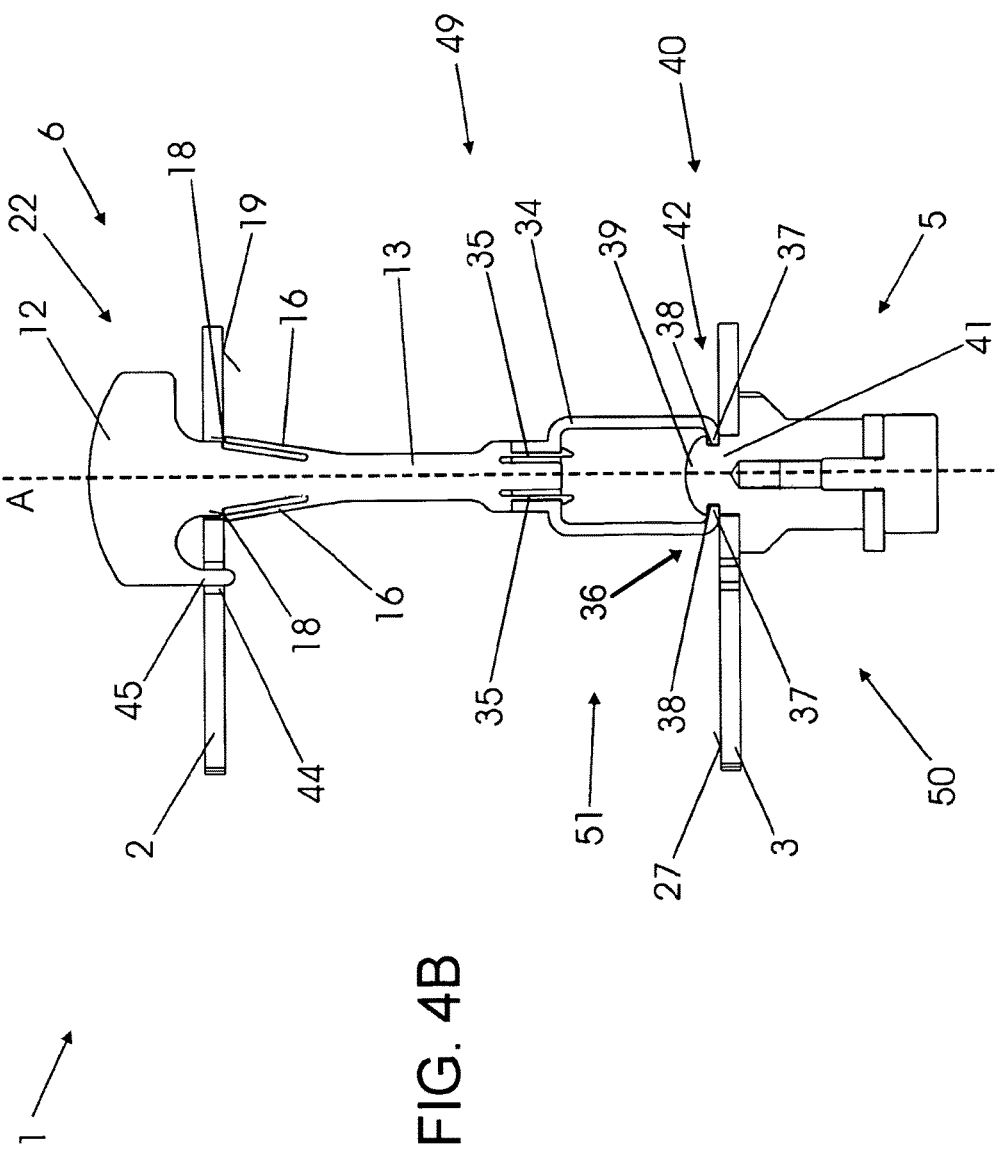
FIG. 4B shows schematically and in cross-section the friction mechanism of FIG. 4A.

FIGS. 4A and 4B schematically show a rail element 1 with another exemplification of friction mechanism 6, 7 in the second position. Friction mechanism 6, 7 is made up of multiple parts and comprises a friction body 13 having a friction head 12 forming a single piece with friction body 13. Friction body 13 with the friction head is planar in configuration and formed from a metal sheet. A friction foot 51 arranged by way of a quick-acting connector 49 and which is configured as friction clamp 34 is provided on friction body 13 at the end opposite friction head 12. The connection between friction clamp 34 and main body 13 is made by way of connection device 49 which comprises two detent links 35 that can move square to axis of rotation A and that engage with friction clamp 34. Friction clamp 34 can be mounted and dismounted in one possible exemplification quickly and simply by way of detent links 35.

Friction clamp 34 is consequently connected by a first end with friction body 13 by way of detent links 35. Friction clamp 34 comprises two free ends 37 at a second end 36 which lies opposite the first end. Free ends 37 are arranged diametrically about axis of rotation A, i.e. they face one another in the direction square to axis of rotation A.

FIGS. 4A and 4B show the friction clamp in its first position. Free ends 37 are engaged in a groove 38 arranged on carrier element 5. A lifting upward of rail element 1 in the direction of axis of rotation A is prevented and/or restricted and/or minimized because of free ends 37 engaging in groove 38. Thus friction clamp 34 and groove 37 together create on carrier element 5 a form-fitting connection which prevents and/or restricts and/or minimizes lower rail element level 3 from moving in the direction of axis of rotation A.

Groove 38 on carrier element 5 is provided above top 27 of lower rail element level 3. In other words, carrier element 5 extends by a peg 50, on which groove 37 is arranged, through the lower rail element level. Peg head 39 which is disposed on peg 50 is asymmetrically configured and comprises in this instance two diametrically opposed curved sections 60 and two flattened sections 61. Groove 38 arranged beneath peg head 39 is ring-shaped, i.e. circular, in configuration.

Friction clamp 34 and peg head 39 are matched to one another in such a way that the friction clamp in a stress-free position and in its second position can be guided past peg head 39, in one possible exemplification in the region of flattened sections 61, so that free ends 37 of the friction clamp lie in the region of groove 38 beneath the flattened sections. After friction mechanism 6 is turned into its first position, free ends 37 still engage in groove 38 but they are arranged beneath curved sections 60 of peg head 39. Peg head 39 and groove 38 are matched to fit friction mechanism 6, 7 and in one possible exemplification are matched to the stress-free condition of the clamp and free ends 37.

Alternatively groove 38 can be configured as an anti-rotation device. For this, in horizontal section groove 38 can, for example, comprise an oval or angular form so that when friction clamp 34 is turned between the first and second position, friction clamp 34 is deflected square to axis of rotation A. In other words, during the movement it is opened up and then comes to rest in a spread condition in the second position. Alternatively, groove 38 may also be configured such that friction clamp 34 is back in its initial position in the second position, i.e. it returns to a stress-free position, for example.

In at least one possible exemplification of the present application, when groove 38 is configured as an anti-rotation device, it can comprise an oval form in horizontal section, or the bottom of the groove can be configured, for example, from at least four sections adjoining each other at angles, with at least two sections being at least partially diametrically opposing, and with the distance of two diametrically opposing angle corners being greater than the distance of two diametrically opposing faces.

FIGS. 4A and 4B also show a positioning device 40 which secures mounted rail element 1 square to axis of rotation A. Positioning device 40 is configured as a locating stud 41 having a corresponding stud mounting 42. Locating stud 41 is configured on carrier element 5 and arranged beneath groove 38 and peg head 39. In this case it has a round cross-section and extends into stud mounting 42 that is configured as a hole in lower rail element level 3. Locating stud 41 and stud mounting 42 are configured with no play between them and so absorb the transverse forces acting on rail element 1. Consequently friction mechanism 6, 7 is kept free from transverse forces.

During assembly, rail element 1 with friction mechanism 6, 7 is fitted vertically onto locating stud 41. In the process, free ends 37 of the friction clamp are guided past flattened sections 61 of peg head 39. In order to secure rail element 1 on carrier element 5, friction mechanism 6, 7 is in this case turned clockwise through ninety degrees so that free ends 37 engage under curved sections 60 of peg head 39 to create a form-fitting connection between carrier element 5 and lower rail element level 3.

Friction mechanism 6, 7 projects through a recess 22 in upper rail element level 2 and is guided in it such that a rotary motion is made possible. Two locking tabs 16 diametrically disposed about axis of rotation A are arranged on friction body 13 in order to promote a good positioning of friction mechanism 6, 7, and prevent its inadvertent removal from rail element 1. Locking tabs 16 are configured as a single piece with the friction body and are stress-free when in the lock position. When in the lock position they also each lie with a support face 18 arranged at a free end up against underside 19 of upper rail element level 2 and prevent and/or restrict and/or minimize the upward extraction of friction mechanism 6, 7 in the direction of axis of rotation A.

Locking tabs 16 can be moved from their lock position (see FIGS. 4A, 4B) to a release position to allow friction mechanism 6, 7 to be dismounted from rail element 1. For this purpose the free ends of locking tabs 16 can be moved square to axis of rotation A and can both be moved toward one another to axis of rotation A against a spring force, i.e. against a bending stress. In the release position, support faces 18 are no longer in contact with underside 19 of upper rail element 2 but are arranged in the region of friction body 13. Friction mechanism 6, 7 can be remove vertically upwards in the direction of axis of rotation A provided friction mechanism 6, 7 is in its second position, i.e. friction clamp 34 is not engaged with groove 38.

FIGS. 4A and 4B also show a rotation limiter 43 (rotation limit stops) that is configured as a curved slot 44 in upper rail element level 2 and in which a rotation lock 45 engages that is matched to curved slot 44 that is disposed in the region of friction head 12 on friction body 13. Curved slot 44 and rotation lock 45 are matched to each other so that in the first position of friction mechanism 6, 7, rotation lock 45 stops at a first end face of curved slot 44 and in the second position of friction mechanism 6, 7 stops at a second end face of curved slot 44 lying opposite the first end face.

In at least one possible exemplification shown in FIGS. 4A and 4B, because of the arrangement and attachment of friction mechanism 6, 7 vertically above carrier element 5, both the securing in the direction of axis of rotation A and the securing square to the direction of axis of rotation A are effected about axis of rotation A so that with this exemplification, possibly few transverse forces have to be absorbed by friction mechanism 6, 7.

Figure 5A:
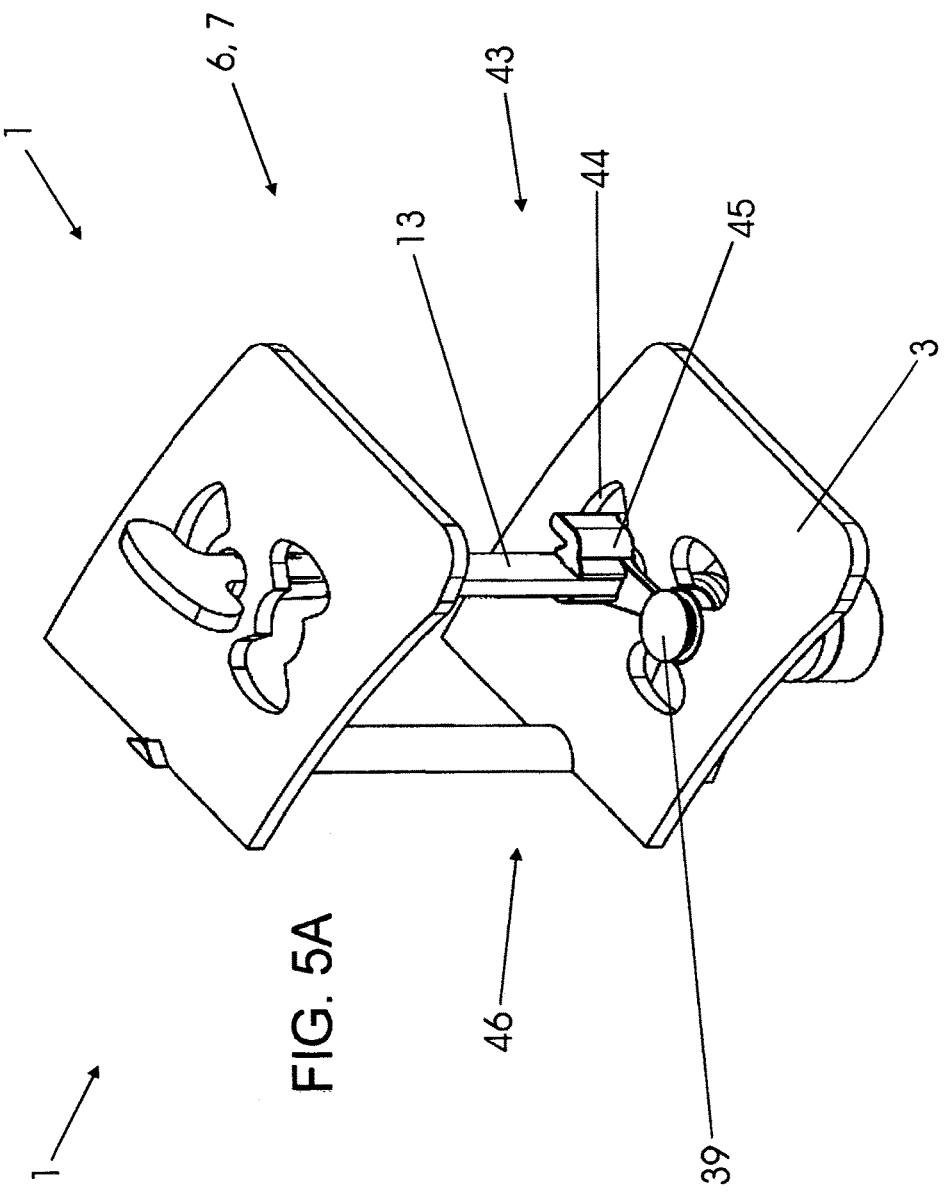
FIG. 5A shows a schematic perspective of a partial section of a rail element with a third alternative exemplification of a friction mechanism in the first position.

FIGS. 5A and 5B show a partial cutaway of a rail element 1 with another alternative exemplification of a friction mechanism 6, 7. Rail element 1 comprises an upper and a lower rail element level 2, 3. A friction body 13 with a friction head 12 configured as a single piece is arranged protruding through upper rail element level 2. Friction body 13 and friction head 12 are planar in configuration. In upper rail element level 2 is a recess 2 configured as a bearing 22 through which friction mechanism 6, 7 protrudes and in which friction mechanism 6, 7 is guided during the rotary movement.

Beneath upper rail element level 2, two locking tabs are arranged on friction body 13; these locking tabs lie with a support face 18 up against underside 19 of upper rail element level 2 and prevent and/or restrict and/or minimize the removal of friction mechanism 6, 7 from rail element 1 upward in the direction of axis of rotation A. Locking tabs 16 are configured according to the exemplification shown in FIGS. 4A and 4B.

Locking tabs 16 are arranged diametrically about axis of rotation A on friction body 13 and can be moved toward one another, i.e. toward axis of rotation A, into the release position. Locking tabs 16 are resilient, i.e. their free ends can be moved against a bending stress from the depicted lock position to a release position. In the release position there is no longer any contact between support face 18 and underside 19 of upper rail element level 2.

At the end of friction body 13 which lies opposite friction head 12, a friction foot 51 is arranged in the region of lower rail element level 3. Friction foot 51 is configured as friction bolt 46 and mounted on friction body 13. Friction bolt 46 can be rotated together with friction body 13 and friction head 12 about axis of rotation A, but is configured as a separate component.

Friction bolt 46 is shown in its first position, i.e. a free end 37 of friction bolt 46 is engaged in a groove 38 provided on a carrier element 5 and creates a form-fitting connection between lower rail element level 3 and groove 38.

FIG. 5B also shows a positioning device 40 that is configured from a locating stud 41 arranged on carrier element 5 and a stud mounting 42 configured in lower rail element level 3. Positioning device 40 prevents and/or restricts and/or minimizes rail element 1 from moving square to axis of rotation A.

FIG. 5B also shows an anti-rotation device 30 in the region of lower rail element level 3. Anti-rotation device 30 is constituted by an elastic O-ring arranged between a face of friction foot 51 and an inner face of a recess 23 in lower rail element level 3. In this way the O-ring generates greater adhesion between friction mechanism 6, 7 and lower rail element level 3, so preventing and/or restricting and/or minimizing an inadvertent twisting of friction mechanism 6, 7.

Groove 38 on carrier element 5 is circular in horizontal cross-section. Peg head 39 arranged above groove 38 is also circular in configuration and projects evenly above the base of the groove. The groove is therefore arranged above lower rail element level 3 and between locating stud 41 and peg head 38.

FIG. 5A also shows a rotation limiter 43. Rotation limiter 43 is provided in the region of lower rail element level 3. It comprises a curved slot 44 in lower rail element level 3 and a rotation lock 45 which is configured as a single piece with friction bolt 46 and which engages in curved slot 44. Rotation lock 45 and curved slot 44 are matched to one another so that rotation lock 45 lies in contact against a first end face of curved slot 44 when friction mechanism 6, 7 is in its first position and against a second end face of curved slot 44 lying opposite the first end face when friction mechanism 6, 7 is in its second position. An exact or substantially exact positioning of friction mechanism 6, 7 in its first and in its second position can be achieved by this means. Curved slot 44 and rotation lock 45 are consequently configured as rotation limiting stops.

FIGS. 6A and 6B show a partial section of a rail element 1 having another alternative exemplification of friction mechanism 6, 7. Friction body 13, friction head 12, locking tabs 16 and positioning device 40 are configured according to the exemplification in FIGS. 5A and 5B. Friction bolt 46 is configured much more simply than in FIGS. 5A and 5B and comprises—as rotation limiter devices—stops in the region of the upper guide level, e.g. according to the principle shown in the dotted circle or according to the configuration as shown in FIGS. 5A and 5B. An O-ring configured as an anti-rotation device 30 is also provided.

Figure 7:
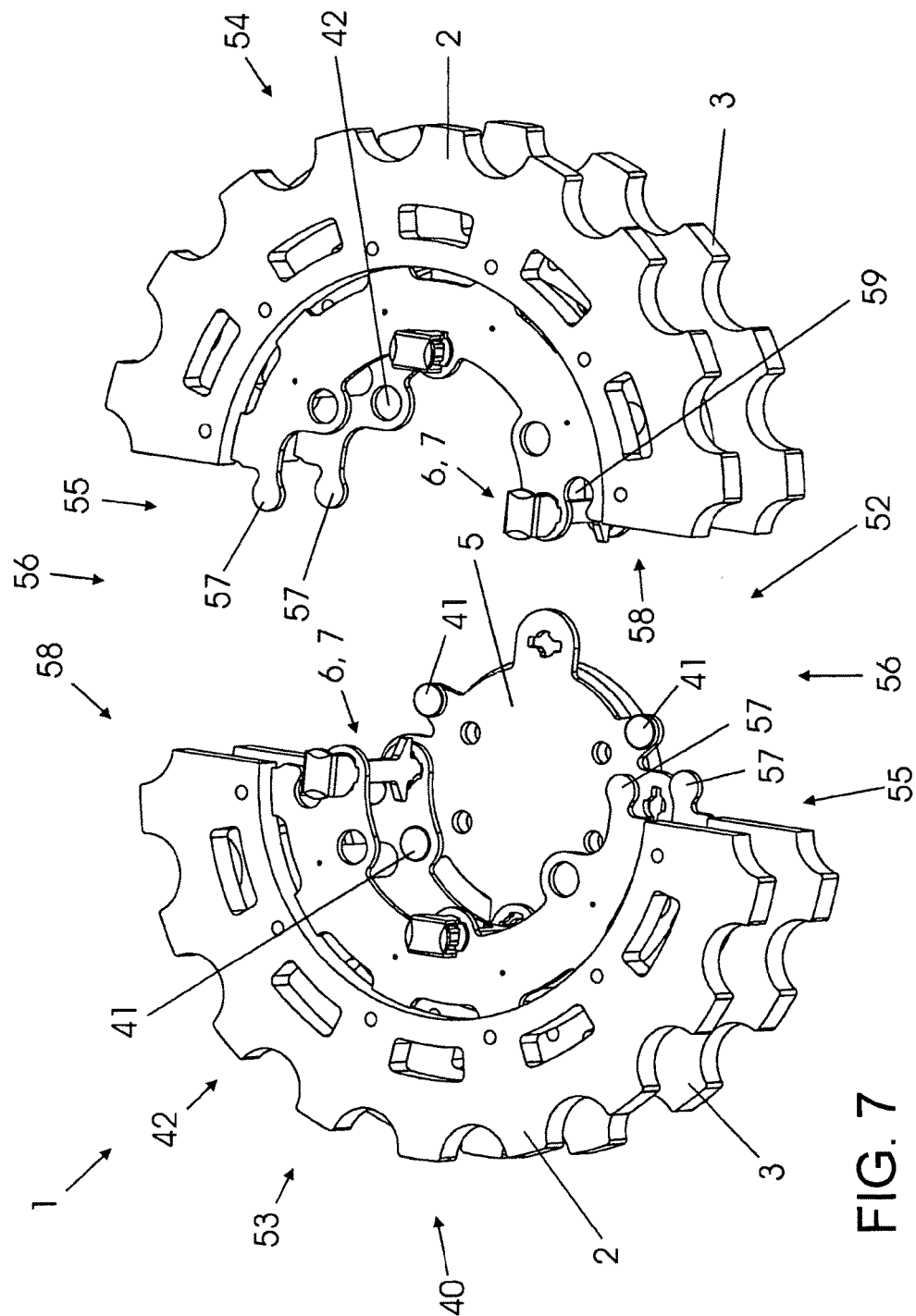
FIG. 7 shows a schematic perspective view of a star-shaped rail element for the rotary conveying of containers and having two rail element segments.

FIG. 7 shows a rail element 1 for the rotary conveying of containers (not shown). Rail element 1 is coupled to a carrier element 5 that is arranged on a drive unit 52.

FIG. 7 shows rail element 1 in a knocked-down or disassembled condition. It comprises two rail element segments 53, 54, each in turn comprising one upper and one lower rail element level 2, 3. Rail element segments 53, 54 are identical in configuration, i.e. lower and upper rail element levels 2, 3 are also identical with one another. The cost of producing rail element 1 is in one possible exemplification low as a result.

At their respective free ends 55, 58, rail element segments 53, 54 comprise a connection device 56. At a first free end 55, each rail element segment 53, 54 comprises in both the upper rail element level 2 and in the lower rail element level 3 a connecting peg or tab 57, and at the second free end a peg or tab mounting or recess 59 which corresponds with connecting peg 57. Connecting peg 57 comprises a flat peg rib and a flat round peg head, each in the x-y-plane, i.e. in a plane square to axis of rotation A of friction mechanism 6, 7. Peg mounting 59 is accordingly correspondingly configured.

Connecting peg 57 and peg mounting 59 therefore comprise a puzzle-type connection form which, in the mounted condition, prevents and/or restricts and/or minimizes any relative motion between rail element segments 53, 54 in a direction B square to axis of rotation A, i.e. in the x-y-plane of rail element segments 53, 54.

Two friction mechanisms 6, 7 are disposed on each rail element segment 53, 54. Unlike the friction mechanisms shown in FIGS. 1 to 3, friction mechanisms 6, 7 shown here do not comprise a splinter guard 19 in the region of lower rail element level 3 but are otherwise identically configured. Alternatively, friction mechanisms 6, 7 can also be used with lower splinter guard 28.

Locating studs 41 belonging to a positioning device 40 are arranged on carrier element 5. With its stud mountings 42 arranged in lower rail element level 3, the mounted rail element segment 53, 54 is positioned vertically, i.e. in the direction of axis of rotation A, onto locating studs 41 which correspond to stud mountings 42. Thus the rotary forces generated by drive unit 52 when in operation are transmitted to rail element segments 53, 54 via positioning device 40.

Friction mechanisms 6, 7 are arranged on rail element segments 53, 54 in such a way that when in a second position they each allow the dismounting or mounting of rail element segments 53, 54 in the direction of axis of rotation A. In a first position however, friction mechanisms 6, 7 engage with carrier element 5 and lower rail element level 3 as described for FIGS. 1 to 3, and prevent and/or restrict and/or minimize the dismounting (or mounting) of rail element segments 53, 54 in the direction of axis of rotation A.

Figure 8:
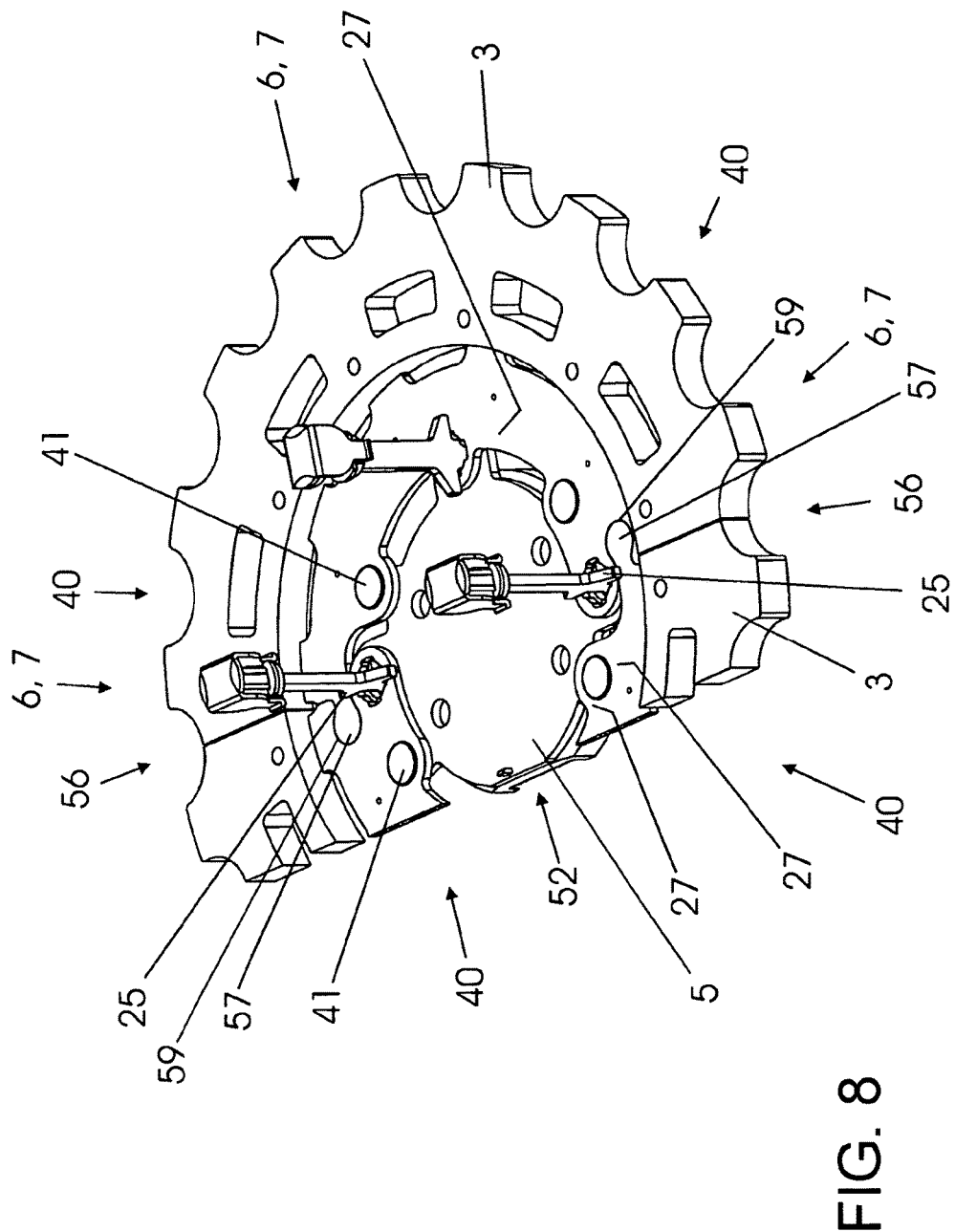
FIG. 8 shows a schematic perspective view of a lower rail element level of the rotary rail element of FIG. 7 having friction mechanisms in the first position.

FIG. 8 shows sections of the two lower rail element levels 3 shown in FIG. 7. Upper rail element levels 2 have been omitted from this view for the sake of clarity. Lower rail element levels 3 are mounted on carrier element 5 which is arranged on a drive unit 52. Friction mechanisms 6, 7 are shown in their first position, the locking position, i.e. friction mechanisms 6, 7 are in contact by their upper friction lugs 25 with a top 27 of lower rail element level 3 and by their lower friction lugs 26 (not shown) with an underside 33 of carrier element 5.

FIG. 8 also shows the interlocking connection device 56 in which each connecting peg 57 engages in peg mounting 59 to create a firm connection in a plane (x-y-plane) square to axis of rotation A between rail element segments 53, 54.

Here, friction mechanisms 6, 7 that are arranged in the region of connection device 56 are oriented relative to connection device 56 so that they lie with upper friction lug 25 on the tops 27 of both lower rail element levels 3. In other words friction mechanisms 6, 7 are arranged in such a way that in their first position they secure both rail element segments 53, 54 in the direction of the axis of rotation A on carrier element 5 and prevent and/or restrict and/or minimize a removing or lifting off of one of rail element segments 53, 54.

The present application relates to a container conveying system comprising a replaceable rail element 2, 3 for guiding containers. In order to be able to mount and dismount the rail element 2, 3 in a possibly simple manner, a friction mechanism 6, 7 that is rotatable about an axis of rotation as well as an extraction blocking element for securing the friction mechanism 6, 7 are provided.

One feature or aspect of an exemplification is believed at the time of the filing of this patent application to possibly reside broadly in a container conveying system comprising: a replaceable rail element 1 for guiding containers, including at least one upper and one lower rail element level 2, 3, a carrier element 5 for mounting the rail element 1, a friction mechanism 6, 7 mounted on the rail element 1 so that it can rotate between at least two positions about an axis of rotation A, whereby the friction mechanism 6, 7 in a first position secures a lower level with the carrier element 5 in the direction of the axis of rotation A, and in a second position the rail element 1 can be removed from the carrier element 5 in the direction of the axis of rotation A, and an extraction blocking element 15 for securing the friction mechanism 6, 7 to the rail element 1 in the direction of the axis of rotation A, which comprises a locking tab 16 that is configured to engage in the upper rail element level 2 and which is moveable between a lock position and a release position.

Another feature or aspect of an exemplification is believed at the time of the filing of this patent application to possibly reside broadly in the container conveying system wherein the locking tab 16 is moveable square to the axis of rotation A.

Yet another feature or aspect of an exemplification is believed at the time of the filing of this patent application to possibly reside broadly in the container conveying system wherein the locking tab 16 is spring mounted.

Still another feature or aspect of an exemplification is believed at the time of the filing of this patent application to possibly reside broadly in the container conveying system wherein the locking tab 16 extends starting from its first end through a recess in the upper rail element level 2.

A further feature or aspect of an exemplification is believed at the time of the filing of this patent application to possibly reside broadly in the container conveying system wherein the friction mechanism 6, 7 is made of up a plurality of parts and comprises a friction body 13, a friction head 12 and/or friction foot 51.

Another feature or aspect of an exemplification is believed at the time of the filing of this patent application to possibly reside broadly in the container conveying system wherein the friction mechanism 6, 7 comprises an anti-rotation device 30 to prevent and/or restrict and/or minimize inadvertent twisting about the axis of rotation A.

Yet another feature or aspect of an exemplification is believed at the time of the filing of this patent application to possibly reside broadly in the container conveying system wherein the anti-rotation device 30 comprises a detent element 31 having a correspondingly configured detent element mount 32.

Still another feature or aspect of an exemplification is believed at the time of the filing of this patent application to possibly reside broadly in the container conveying system wherein the anti-rotation device 30 comprises a clamping device.

A further feature or aspect of an exemplification is believed at the time of the filing of this patent application to possibly reside broadly in the container conveying system wherein, for securing the rail element 1 to the carrier element 5 in the direction of the axis of rotation A, the friction mechanism 6, 7 comprises a bolt element which in the lock position comprises a form-fitting connection with the carrier element 5.

Another feature or aspect of an exemplification is believed at the time of the filing of this patent application to possibly reside broadly in the container conveying system wherein the bolt element comprises an upper friction lug 25 and a lower friction lug 26, with the upper friction lug 25 and the lower friction lug 26 being configured and arranged to engage on the top of the lower level and on the underside of the carrier element 5 respectively.

Yet another feature or aspect of an exemplification is believed at the time of the filing of this patent application to possibly reside broadly in the container conveying system wherein the bolt element comprises a friction bolt 46 or a friction clamp 34.

Still another feature or aspect of an exemplification is believed at the time of the filing of this patent application to possibly reside broadly in the container conveying system wherein the friction clamp 34 comprises two free ends 36, 37 pointing to one another and aligned square to the axis of rotation A.

A further feature or aspect of an exemplification is believed at the time of the filing of this patent application to possibly reside broadly in the container conveying system wherein the friction bolt 46 and/or friction clamp 34 is configured to match a groove 38 provided on the carrier element 5.

One feature or aspect of an exemplification is believed at the time of the filing of this patent application to possibly reside broadly in the container conveying system wherein the friction mechanism 6, 7 comprises at least one splinter guard 21, 28.

Another feature or aspect of an exemplification is believed at the time of the filing of this patent application to possibly reside broadly in the container conveying system wherein a lower splinter guard plate 28 is provided which generates a resilient preload for a backlash-free connection but which does not transmit the holding forces.

Yet another feature or aspect of an exemplification is believed at the time of the filing of this patent application to possibly reside broadly in the container conveying system wherein a positioning device 40 for securing the rail element 1 is arranged square to the direction of the axis of rotation A.

Still another feature or aspect of an exemplification is believed at the time of the filing of this patent application to possibly reside broadly in the container conveying system wherein the positioning device 40 is disposed on the carrier element 5.

A further feature or aspect of an exemplification is believed at the time of the filing of this patent application to possibly reside broadly in the container conveying system wherein the positioning device 40 comprises at least one locating stud 41 and a stud mounting 42 corresponding to the locating stud 41, with the stud mounting 42 being arranged on the lower rail element level 3 and the locating stud 41 on the carrier element 5.

Another feature or aspect of an exemplification is believed at the time of the filing of this patent application to possibly reside broadly in the container conveying system wherein the carrier element 5 comprises at least one mounting leg 9.

Yet another feature or aspect of an exemplification is believed at the time of the filing of this patent application to possibly reside broadly in the container conveying system wherein at least one glide rail or glide element is provided on the replaceable rail element 1, in one possible exemplification on at least one of the rail element levels 2, 3.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the patents, patent applications, patent publications, and other documents, except for the exceptions indicated herein, are hereby incorporated by reference as if set forth in their entirety herein except for the exceptions indicated herein, as follows: DE 699 02 944 T2, DE 10 2009 018 731 A1, and DE 44 36 201 A1.

All of the patents, patent applications, patent publications, and other documents, except for the exceptions indicated herein, which were cited in the International Search Report dated Feb. 11, 2015, and/or cited elsewhere, as well as the International Search Report document itself, are hereby incorporated by reference as if set forth in their entirety herein except for the exceptions indicated herein, as follows: DE 69 90 2944, having the English translation of the German title "Mechanical fixture for affixing a mechanical assembly to a base unit, comprises a quick release and attachment system", published on Aug. 7, 2003.

All of the patents, patent applications, patent publications, and other documents, except for the exceptions indicated herein, which were cited in the German Office Action dated Jul. 17, 2014, and/or cited elsewhere, as well as the German Office Action document itself, are hereby incorporated by reference as if set forth in their entirety herein except for the exceptions indicated herein, as follows: DE 10 2009 018 731 A1, having the German title "Werkzeugloser Austausch von Flaschenführungskurven", published on Oct. 28, 2010; DE 69 90 2944, having the English translation of the German title "Mechanical fixture for affixing a mechanical assembly to a base unit, comprises a quick release and attachment system", published on Aug. 7, 2003; and DE 44 36 201 A1, having the title "Clamp for guiding bottles etc. through guide spiders, arcs etc", published on Apr. 18, 1996.

The corresponding foreign and international patent publication applications, namely, Federal Republic of Germany Patent Application No. 10 2014 000 052.4, filed on Jan. 8, 2014, having inventors Andreas FAHLDIECK and Nils MALLITZKI, and DE-OS 10 2014 000 052.4 and DE-PS 10 2014 000 052.4, and International Application No. PCT/EP2014/077274, filed on Dec. 10, 2014, having WIPO Publication No. WO 2015/104125 and inventors Andreas FAHLDIECK and Nils MALLITZKI, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2014/077274 and German Patent Application 10 2014 000 052.4, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2014/077274 and DE 10 2014 000 052.4 from which this patent application claims priority which do not have to do with the correction of the translation in this patent application are not to be included in this patent application in the incorporation by reference.

Any statements about admissions of prior art in the original foreign patent applications PCT/EP2014/077274 and DE 10 2014 000 052.4 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

LIST OF AT LEAST PARTIAL NOMENCLATURE

1 Rail element
2 Upper rail element level
3 Lower rail element level
4 Spacer
5 Carrier element
6 First friction mechanism
7 Second friction mechanism
8 Underside of lower rail element level
9 Mounting leg
10 Free ends of mounting leg
11 Rotation limit stop
12 Friction head
13 Friction body
14 Mount on friction head for friction body
15 Extraction blocking element
16 Locking tab
17 Locking lug
18 Support face, locking lug
19 Underside of upper rail element level
20 Bearing guide, friction head
21 Upper splinter guard
22 Recess, upper rail element level
23 Recess, lower rail element level
24 Mounting slit, friction head
25 Upper friction lug
26 Lower friction lug
27 Top of lower rail element level
28 Lower splinter guard
29 Top of upper rail element level
30 Anti-rotation device
31 Detent element
32 Detent element mount
33 Underside of carrier element
34 Friction clamp
35 Detent links
36 Second end of friction clamp
37 Free ends of friction clamp
38 Groove on the carrier element
39 Peg head
40 Positioning device
41 Locating stud
42 Stud mounting 43 Rotation limiter
44 Curved slot
45 Rotation lock
46 Friction bolt
47 Carrier peg
48 Carrier clasp
49 Connection device
50 Peg
51 Friction foot
52 Drive unit
53 Rail element segments
54 Rail element segments
55 First free end of rail element segments
56 Connection device
57 Connecting peg
58 Second free end
59 Peg mounting
60 Curved sections, peg head
61 Flattened sections, peg head
A Direction of the axis of rotation
B Square to the direction of the axis of rotation

What is claimed is:

1. A container conveyor arrangement for conveying containers, such as bottles, said container conveyor arrangement comprising:
   a replaceable guide structure configured to guide containers;
   said guide structure comprising an upper guide element and a lower guide element;
   a carrier element configured to support said guide structure;
   an elongated connecting device being configured to connect said guide structure and said carrier element;
   said connecting device being rotatable about its length between:
      a first position in which said connecting device secures said lower guide element to said carrier element to minimize movement of said connecting device, and thus said guide structure, with respect to said carrier element in the direction of the length of said connecting device; and
      a second position in which said connecting device does not secure said lower guide element to said carrier element to permit movement of said connecting device, and thus said guide structure, with respect to said carrier element in the direction of the length of said connecting device;
   a blocking element configured to secure said connecting device to said guide structure;
   said blocking element comprising a deformable locking tab;
   said locking tab comprising an end portion configured to engage said upper guide element to minimize movement of said connecting device with respect to said guide structure in the direction of the length of said connecting device;
   said end portion being moveable between an engaged, lock position and a disengaged, release position by deformation of said locking tab;
   said locking tab is moveable in a direction transverse or perpendicular to the length of said connecting device;
   said connecting device comprises an anti-rotation device to minimize inadvertent twisting about the length of said connecting device; and
   said anti-rotation device comprises a detent element and a correspondingly configured detent element mount.

2. The container conveyor arrangement according to claim 1, wherein said locking tab is spring mounted.

3. The container conveyor arrangement according to claim 1, wherein said locking tab is disposed to extend through a recess or opening in said upper guide element.

4. The container conveyor arrangement according to claim 1, wherein said connecting device comprises a body portion, a head portion and/or a foot portion.

5. The container conveyor arrangement according to claim 1, further comprising a positioning device configured to secure said guide structure on said carrier element, which positioning device is configured to absorb forces that occur transverse or perpendicular to the length of said connecting device at said guide structure.

6. The container conveyor arrangement according to claim 5, wherein said positioning device comprises a locating stud disposed on said carrier element, and a stud mounting corresponding to said locating stud and disposed on said lower guide element.

7. The container conveyor arrangement according to claim 1, wherein said carrier element comprises at least one mounting leg.

8. The container conveyor arrangement according to claim 1, wherein at least one glide rail or glide element is disposed on said guide structure on at least one of said guide elements.

9. A container conveyor arrangement for conveying containers, such as bottles, said container conveyor arrangement comprising:
   a replaceable guide structure configured to guide containers;
   said guide structure comprising an upper guide element and a lower guide element;
   a carrier element configured to support said guide structure;
   an elongated connecting device being configured to connect said guide structure and said carrier element;
   said connecting device being rotatable about its length between:
      a first position in which said connecting device secures said lower guide element to said carrier element to minimize movement of said connecting device, and thus said guide structure, with respect to said carrier element in the direction of the length of said connecting device; and
      a second position in which said connecting device does not secure said lower guide element to said carrier element to permit movement of said connecting device, and thus said guide structure, with respect to said carrier element in the direction of the length of said connecting device;
   a blocking element configured to secure said connecting device to said guide structure;
   said blocking element comprising a deformable locking tab;
   said locking tab comprising an end portion configured to engage said upper guide element to minimize movement of said connecting device with respect to said guide structure in the direction of the length of said connecting device;
   said end portion being moveable between an engaged, lock position and a disengaged, release position by deformation of said locking tab;
   said locking tab is moveable in a direction transverse or perpendicular to the length of said connecting device; and said connecting device comprises a bolt element which, in said lock position, comprises a form-fitting connection with said carrier element.

10. The container conveyor arrangement according to claim 9, wherein said bolt element comprises an upper friction lug and a lower friction lug, which upper and lower friction lugs are configured and disposed to engage on a top surface and a bottom surface of said lower guide element, respectively.

11. The container conveyor arrangement according to claim 10, wherein said bolt element comprises a friction bolt or a friction clamp.

12. The container conveyor arrangement according to claim 11, wherein said friction clamp comprises two free ends pointing to one another and aligned transverse or perpendicular to the length of said connecting device.

13. The container conveyor arrangement according to claim 12, wherein said friction bolt and/or said friction clamp is configured to match a groove provided on said carrier element.

14. A container conveyor arrangement for conveying containers, such as bottles, said container conveyor arrangement comprising:
  a replaceable guide structure configured to guide containers;
  said guide structure comprising an upper guide element and a lower guide element;
  a carrier element configured to support said guide structure;
  an elongated connecting device being configured to connect said guide structure and said carrier element;
  said connecting device being rotatable about its length between:
    a first position in which said connecting device secures said lower guide element to said carrier element to minimize movement of said connecting device, and thus said guide structure, with respect to said carrier element in the direction of the length of said connecting device; and
    a second position in which said connecting device does not secure said lower guide element to said carrier element to permit movement of said connecting device, and thus said guide structure, with respect to said carrier element in the direction of the length of said connecting device;
  a blocking element configured to secure said connecting device to said guide structure;
  said blocking element comprising a deformable locking tab;
  said locking tab comprising an end portion configured to engage said upper guide element to minimize movement of said connecting device with respect to said guide structure in the direction of the length of said connecting device;
  said end portion being moveable between an engaged, lock position and a disengaged, release position by deformation of said locking tab;
  said locking tab is moveable in a direction transverse or perpendicular to the length of said connecting device; and
  said connecting device comprises at least one splinter guard.

15. The container conveyor arrangement according to claim 14, wherein a lower splinter guard plate is provided which generates a resilient pre-load for a backlash-free connection, but which does not transmit said holding forces.

* * * * *